(12) United States Patent
Olson et al.

(10) Patent No.: US 10,785,906 B2
(45) Date of Patent: Sep. 29, 2020

(54) PLANT PROCESSING SYSTEM

(71) Applicant: PEARSON INCORPORATED, Sioux Falls, SD (US)

(72) Inventors: Roy Olson, Sioux Falls, SD (US); Joshua Tracy, Harrisburg, SD (US); Alex Pearson, Sioux Falls, SD (US)

(73) Assignee: Pearson Incorporated, Sioux Falls, SD (US)

( * ) Notice: Subject to any disclaimer, the term of this patent is extended or adjusted under 35 U.S.C. 154(b) by 0 days.

(21) Appl. No.: 16/589,592

(22) Filed: Oct. 1, 2019

(65) Prior Publication Data

US 2020/0260649 A1    Aug. 20, 2020

Related U.S. Application Data

(63) Continuation of application No. 16/559,764, filed on Sep. 4, 2019, which is a continuation-in-part of (Continued)

(51) Int. Cl.
| | |
|---|---|
| *A01D 33/02* | (2006.01) |
| *A01D 46/02* | (2006.01) |
| *A01G 3/00* | (2006.01) |
| *B02C 21/02* | (2006.01) |
| *B02C 25/00* | (2006.01) |

(52) U.S. Cl.
CPC .............. *A01D 33/02* (2013.01); *A01D 46/02* (2013.01); *A01G 3/002* (2013.01); *B02C 21/02* (2013.01); *A01G 2003/005* (2013.01); *B02C 25/00* (2013.01)

(58) Field of Classification Search
CPC ........ A01D 33/02; A01D 33/08; A01D 46/02; A01D 45/065; A01B 17/026; A23N 15/00
See application file for complete search history.

(56) References Cited

U.S. PATENT DOCUMENTS

| | | | |
|---|---|---|---|
| 254,974 A | 3/1882 | Hollingsworth | |
| 288,743 A | 11/1883 | Swingle | |

(Continued)

FOREIGN PATENT DOCUMENTS

| | | |
|---|---|---|
| CA | 2665876 | 11/2010 |
| CA | 3012914 | 10/2018 |

(Continued)

OTHER PUBLICATIONS

Charles Stark and Julie Kalivoda, "Evaluating Particle Size of Feedstuffs", publication, Nov. 2016, 4 pages, K-State Research and Extension, Kansas State University Agricultural Experiment Station and Cooperative Extension Services, Manhattan, Kansas.

*Primary Examiner* — Alicia Torres
(74) *Attorney, Agent, or Firm* — Jeffrey A. Proehl; Woods, Fuller, Shultz & Smith, PC

(57) ABSTRACT

A plant processing system may include a plant stripping apparatus with a frame and a plurality of stripping fingers including at least two groups of the stripping fingers being movable relative to each other. Each group of fingers may extend from a respective working surface, and the working surfaces may be oriented in substantial opposition to each other with a gap being formed between the first and second working surfaces to provide a pathway for movement of plant materials between an input and an output of the stripping apparatus.

18 Claims, 34 Drawing Sheets

Related U.S. Application Data application No. 16/279,445, filed on Feb. 19, 2019, now Pat. No. 10,524,423.

(56) References Cited

U.S. PATENT DOCUMENTS

| | | |
|---|---|---|
| 417,836 A | 12/1889 | Ponsar |
| 454,950 A | 6/1891 | Sewell |
| 473,957 A | 5/1892 | Pollock |
| 621,744 A | 3/1899 | Bowden |
| 664,836 A | 1/1901 | Davidson |
| 738,166 A | 9/1903 | Davidson |
| 1,466,508 A | 8/1923 | Lake |
| 1,568,267 A | 1/1926 | Carter |
| 1,611,675 A | 12/1926 | Prestemon |
| 1,678,134 A | 7/1928 | Cromer |
| 2,053,038 A | 9/1936 | Mackenzie |
| 2,118,010 A | 5/1938 | Hazle, Jr. |
| 2,608,973 A | 9/1952 | Coons |
| 3,226,041 A | 12/1965 | Graumann |
| 3,304,355 A | 2/1967 | Pobst, Jr. |
| 3,362,649 A | 1/1968 | Odden |
| 3,683,559 A | 8/1972 | Kalwaites |
| 3,752,315 A | 8/1973 | Hubach |
| 4,165,280 A | 8/1979 | Holley |
| 4,177,900 A | 12/1979 | Kluthe |
| 4,202,629 A | 5/1980 | Jakobs |
| 4,213,855 A | 7/1980 | Vonbennigsen-Mackiewicz |
| 4,361,476 A | 11/1982 | Brewer |
| 4,387,552 A | 6/1983 | Lancaster |
| 4,442,876 A | 4/1984 | Koike |
| 4,468,265 A | 8/1984 | MacLaughlin |
| 4,608,156 A | 8/1986 | Reddish |
| 4,645,484 A | 2/1987 | Niske |
| 4,786,001 A | 11/1988 | Ephraim |
| 4,862,570 A | 9/1989 | Bald |
| 4,941,290 A | 7/1990 | Holyoke |
| 4,986,997 A | 1/1991 | Posner |
| 5,044,115 A | 9/1991 | Richardson |
| 5,052,088 A | 10/1991 | Hagewood |
| 5,100,062 A | 3/1992 | Baltensperger |
| 5,115,984 A | 5/1992 | Satake |
| 5,192,028 A | 3/1993 | Curran |
| 5,201,470 A | 4/1993 | Baltensperger |
| 5,247,717 A * | 9/1993 | Smith ................ E01H 12/00 15/194 |
| 5,251,144 A | 10/1993 | Ramamurthi |
| 5,315,789 A | 5/1994 | Takashi |
| 5,366,167 A | 11/1994 | McCarthy |
| 5,392,998 A | 2/1995 | Suessegger |
| 5,419,107 A | 5/1995 | Shelbourne |
| 5,501,629 A | 3/1996 | Kawana |
| 5,523,701 A | 6/1996 | Smith |
| 5,533,371 A | 7/1996 | Frischknecht |
| 5,632,135 A | 5/1997 | Baker, IV |
| 5,717,209 A | 2/1998 | Bigman |
| 5,846,129 A | 12/1998 | Dragt |
| 6,016,626 A | 1/2000 | Auer |
| 6,176,683 B1 | 1/2001 | Yang |
| 6,199,777 B1 | 3/2001 | Satake |
| 6,258,308 B1 | 7/2001 | Brady |
| 6,293,478 B1 | 9/2001 | Livrieri |
| 6,365,416 B1 | 4/2002 | Elsohly |
| 6,372,281 B1 | 4/2002 | Metzger |
| 6,443,376 B1 | 9/2002 | Huang |
| 6,517,016 B1 | 2/2003 | Feige |
| 6,589,598 B2 | 7/2003 | Ochiai |
| 6,730,519 B2 | 5/2004 | Elsohly |
| 6,990,431 B2 | 1/2006 | Beaudoin |
| 7,006,953 B2 | 2/2006 | Takemura |
| 7,083,544 B2 | 8/2006 | Goransson |
| 7,170,251 B2 | 1/2007 | Huang |
| 7,183,735 B2 | 2/2007 | Heinemann |
| 7,206,719 B2 | 4/2007 | Lindsay |
| 7,381,017 B2 | 6/2008 | Wang |
| 7,419,694 B2 | 9/2008 | Korolchuk |
| 7,425,344 B2 | 9/2008 | Korolchuk |
| 7,540,697 B2 | 1/2009 | Wang |
| 7,568,641 B2 | 8/2009 | Dreimann |
| 7,592,468 B2 | 9/2009 | Goodwin |
| 7,756,678 B2 | 7/2010 | Bonissone |
| 7,832,241 B2 | 11/2010 | Mantovan |
| 8,144,005 B2 | 3/2012 | Hu |
| 8,206,061 B1 | 6/2012 | Hansen |
| 8,211,341 B2 | 7/2012 | Lustiger |
| 8,343,553 B2 | 1/2013 | Hospodor |
| 8,485,052 B2 | 7/2013 | Gebhart |
| 8,690,087 B2 | 4/2014 | Holl |
| 8,734,143 B2 | 5/2014 | Morris |
| 8,842,267 B2 | 9/2014 | Heine |
| 9,066,910 B2 | 6/2015 | Rosenblatt |
| 9,104,650 B2 | 8/2015 | Hosek |
| 9,510,507 B1 | 12/2016 | Abbott |
| 9,592,457 B2 | 3/2017 | Dabao |
| 9,649,349 B1 | 5/2017 | Tucker |
| 9,651,467 B2 | 5/2017 | Deguchi |
| 9,694,040 B2 | 7/2017 | Scialdone |
| 9,723,786 B2 | 8/2017 | Brummelhuis |
| 9,744,200 B1 | 8/2017 | Tucker |
| 9,795,338 B2 | 10/2017 | Kang |
| 9,797,822 B2 | 10/2017 | Little, III |
| 9,801,956 B2 | 10/2017 | Kularatne |
| 9,803,063 B2 | 10/2017 | Reddy |
| 9,804,092 B2 | 10/2017 | Zeng |
| 9,808,538 B2 | 11/2017 | Kularatne |
| 9,919,315 B2 | 3/2018 | Pearson |
| 9,959,514 B2 | 5/2018 | Phan |
| 9,974,821 B2 | 5/2018 | Kennedy |
| 10,143,706 B2 | 12/2018 | Kotra |
| 10,322,487 B1 | 6/2019 | Hansen |
| 10,399,082 B1 | 9/2019 | Pearson |
| 2002/0022899 A1 | 2/2002 | Dehy |
| 2002/0168911 A1 | 11/2002 | Tonner |
| 2002/0175055 A1* | 11/2002 | Ryde .................... B65G 15/34 198/847 |
| 2003/0117426 A1 | 1/2003 | Schmidt |
| 2004/0096585 A1 | 5/2004 | Bonnebat |
| 2005/0188668 A1* | 9/2005 | Geraghty ............... A01D 42/06 56/344 |
| 2006/0073258 A1 | 4/2006 | Korolchuk |
| 2006/0207862 A1* | 9/2006 | Costanzo ............... B65G 17/24 198/698 |
| 2006/0231021 A1 | 10/2006 | Friske |
| 2007/0170291 A1 | 7/2007 | Naganawa |
| 2007/0209347 A1 | 9/2007 | Malmros |
| 2007/0294121 A1 | 12/2007 | Galt |
| 2008/0063330 A1 | 3/2008 | Orlowski |
| 2008/0167483 A1 | 7/2008 | Whittle |
| 2008/0203956 A1 | 8/2008 | Cohen |
| 2008/0275660 A1 | 11/2008 | Bhateja |
| 2009/0093191 A1 | 4/2009 | Glide |
| 2009/0295561 A1 | 12/2009 | Hu |
| 2010/0030926 A1 | 2/2010 | Boussy |
| 2010/0059609 A1 | 3/2010 | Teeter |
| 2010/0127217 A1 | 5/2010 | Lightowlers |
| 2011/0067374 A1 | 3/2011 | James |
| 2011/0113740 A1 | 5/2011 | Desmarais |
| 2011/0276828 A1 | 11/2011 | Tamaki |
| 2012/0005107 A1 | 1/2012 | Lowden |
| 2012/0046352 A1 | 2/2012 | Hospodor |
| 2012/0244266 A1 | 9/2012 | Ku |
| 2013/0087644 A1 | 4/2013 | Ephraim |
| 2013/0271110 A1 | 10/2013 | Yamanaka |
| 2013/0301375 A1 | 11/2013 | Stephan |
| 2014/0014748 A1 | 1/2014 | Zeeck |
| 2014/0048459 A1 | 2/2014 | Hafford |
| 2014/0145018 A1 | 5/2014 | Niklewski |
| 2014/0245799 A1 | 9/2014 | Kim |
| 2014/0299688 A1 | 10/2014 | Carbonini |
| 2015/0027096 A1 | 1/2015 | Black |
| 2015/0129698 A1 | 5/2015 | Olson |
| 2015/0156967 A1 | 6/2015 | Steenland |
| 2015/0211971 A1 | 7/2015 | Little, III |
| 2015/0300800 A1 | 10/2015 | Van Valkenburgh |
| 2015/0324759 A1 | 11/2015 | Bansal |

(56) References Cited

U.S. PATENT DOCUMENTS

| | | |
|---|---|---|
| 2015/0346717 A1 | 12/2015 | Hosek |
| 2016/0100524 A1 | 4/2016 | Young |
| 2016/0120123 A1 | 5/2016 | Brummelhuis |
| 2016/0245588 A1 | 8/2016 | Baugh |
| 2016/0374386 A1 | 12/2016 | Desmarais |
| 2017/0027105 A1 | 2/2017 | Wenger |
| 2017/0080466 A1 | 3/2017 | Godwin |
| 2017/0131194 A1 | 5/2017 | Little, III |
| 2017/0333257 A1 | 11/2017 | Schmitz |
| 2017/0333809 A1 | 11/2017 | Lopa |
| 2018/0035610 A1 | 2/2018 | Wieker |
| 2018/0126578 A1 | 5/2018 | Raichart |
| 2018/0213722 A1 | 8/2018 | Pratt |
| 2019/0124840 A1 | 5/2019 | Bates |
| 2019/0276420 A1 | 9/2019 | Cho |

FOREIGN PATENT DOCUMENTS

| | | |
|---|---|---|
| CN | 101401506 | 6/2012 |
| CN | 202873360 | 4/2013 |
| CN | 103430692 | 12/2013 |
| CN | 103497823 | 1/2014 |
| CN | 104194920 | 12/2014 |
| CN | 204907202 | 12/2015 |
| CN | 205030140 | 2/2016 |
| CN | 105594370 | 5/2016 |
| CN | 108064545 | 5/2018 |
| CN | 108076804 | 5/2018 |
| CN | 207385669 | 5/2018 |
| CN | 108624394 | 10/2018 |
| CN | 108718676 | 11/2018 |
| CN | 108811715 | 11/2018 |
| CN | 108633454 | 12/2018 |
| CN | 109363026 | 2/2019 |
| DE | 2737115 | 3/1979 |
| DE | 2807634 | 8/1979 |
| DE | 19627137 | 1/1998 |
| DE | 102005055373 | 5/2007 |
| EP | 0383410 | 8/1990 |
| EP | 1195668 | 9/2002 |
| EP | 1757181 | 2/2007 |
| EP | 2556740 | 2/2013 |
| FR | 2885009 | 11/2006 |
| GB | 7360922 | 8/1955 |
| GB | 973177 | 10/1964 |
| JP | 2010201440 | 9/2010 |
| RU | 2119737 | 10/1998 |
| WO | 9419970 | 9/1994 |
| WO | WO-0000012 A1 * | 1/2000 .......... A01D 17/101 |
| WO | 2005119089 | 12/2005 |
| WO | 2007066847 | 6/2007 |
| WO | 2007133098 | 11/2007 |
| WO | 2009128711 | 10/2009 |
| WO | 2010082322 | 7/2010 |
| WO | 2010130035 | 11/2010 |
| WO | 2013160576 | 10/2013 |
| WO | 2017051398 | 3/2017 |
| WO | 2018014135 | 1/2018 |
| WO | 2019041017 | 3/2019 |
| WO | 2019119153 | 6/2019 |
| WO | 2019157783 | 8/2019 |

* cited by examiner

PLANT PROCESSING SYSTEM

REFERENCE TO RELATED APPLICATIONS

This patent application is a continuation of U.S. patent application Ser. No. 16/559,764, filed Sep. 4, 2019, which is a continuation-in-part of U.S. patent application Ser. No. 16/279,445, filed Feb. 19, 2019, each of which is hereby incorporated by reference in their entireties.

BACKGROUND

Field

The present disclosure relates to plant processing machinery and more particularly pertains to a new plant processing system for separating constituent parts of plant material from each other.

Description of the Prior Art

The harvesting and processing of cannabis plant material for obtaining extracts of the plants, such as cannabidiol (CBD), on a large scale is a developing technology. For example, existing harvesting apparatus such as crop harvesters have been utilized to harvest the cannabis plant material (such as industrial hemp) and chop the plant material into a fairly uniform mixture of the plant parts. Of course, harvesting and processing by hand has been utilized for quite some time but is labor-intensive and inefficient for large-scale processing and production of the various extracts obtainable from the cannabis plant material, such as the oil of the cannabis plant. Moreover, traditional hand harvesting typically utilizes grinding or milling of the dried plant material to produce a mixture of all or virtually all of the plant parts for further processing such as isolation of the desired extract of the plant.

SUMMARY

In one aspect, the present disclosure relates to a plant processing system for processing plant material having at least two types of constituent parts attached together. The system may comprise a plant stripping apparatus configured to detach the constituent parts of the plant material from each other, with the plant stripping apparatus having an input and an output. The plant stripping apparatus may be elongated in a longitudinal direction and having a lateral direction oriented substantially perpendicular to the longitudinal direction. The plant stripping apparatus may comprise a frame and a plurality of stripping fingers having at least two groups of the stripping fingers including a first said group of stripping fingers and a second said group of stripping fingers. At least one group of said stripping fingers may be movable with respect to the frame along a path of movement, the first group of fingers may extend from a first working surface and the second group of fingers may extend from a second working surface. The first working surface may be oriented in substantial opposition to the second working surface, and a gap may be formed between the first and second working surfaces to provide a pathway for movement of plant materials between the input and output of the stripping apparatus.

In another aspect, the present disclosure relates to a plant processing system for processing plant material having at least two types of constituent parts attached together. The system may comprise a plant stripping apparatus configured to detach the constituent parts of the plant material from each other, with the plant stripping apparatus having an input and an output and being elongated in a longitudinal direction with a lateral direction oriented substantially perpendicular to the longitudinal direction. The plant stripping apparatus may include a frame and a plurality of stripping fingers. The fingers may comprise at least two groups of the stripping fingers including a first said group of stripping fingers and a second said group of stripping fingers, and at least one group of said stripping fingers may be movable with respect to the frame along a path of movement. The first group of fingers may extend from a first working surface and the second group of fingers may extend from a second working surface, and the first working surface may be oriented in substantial opposition to the second working surface. A gap may be formed between the first and second working surfaces, and the gap may provide a pathway for movement of plant materials between the input and output of the stripping apparatus. The stripping apparatus may further comprise at least one belt on which at least one of said groups of stripping fingers is mounted. The at least one belt has a first surface, and a portion of the first surface may form the first working surface from which the first group of fingers extends.

In another aspect, the present disclosure relates to a plant processing system for processing plant material having at least two types of constituent parts attached together. The system may comprise a plant stripping apparatus configured to detach the constituent parts of the plant material from each other, with the plant stripping apparatus having an input and an output and being elongated in a longitudinal direction and having a lateral direction oriented substantially perpendicular to the longitudinal direction. The plant stripping apparatus may include a frame and a plurality of stripping fingers. The fingers may comprise at least two groups of the stripping fingers including a first said group of stripping fingers and a second said group of stripping fingers, and at least one group of said stripping fingers being movable with respect to the frame along a path of movement. The first group of fingers may extend from a first working surface and the second group of fingers may extend from a second working surface, and the first working surface may be oriented in substantial opposition to the second working surface. A gap may be formed between the first and second working surfaces, and the gap may provide a pathway for movement of plant materials between the input and output of the stripping apparatus. The fingers of the first group of fingers and the fingers of the second group of fingers may be positioned substantially adjacent to each other, and the fingers of the first group of fingers may extend along a first longitudinal line and the fingers of the second group of fingers may extend along a second longitudinal line. The first longitudinal line may be laterally offset with respect to the second longitudinal line such that fingers of the first group of fingers move by fingers of the second group of fingers substantially without contact between the fingers of the first and second groups. The fingers of the first group of fingers may extend upwardly and the fingers of the second group of fingers may extend downwardly. The stripping apparatus may comprise a pair of belts with a first belt and a second belt, and the first belt may have a first surface with a portion of the first surface forming the first working surface, and the second belt may have a second surface with a portion of the second surface forming the second working surface. The first group of stripping fingers may be mounted on the first belt and the second group of stripping fingers may be mounted on the second belt. The system may further include a plant part separating apparatus receiving plant material from the output of the plant stripping apparatus and being configured to separate first plant parts of the constituent parts of the plant material from second plant parts of the constituent parts of the plant material. The plant part separating apparatus may be configured to create a pair of streams of the constituent parts, with a first said stream including the first plant parts of the constituent parts of the plant material and a second said stream including the second plant parts of the constituent parts of the plant material.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
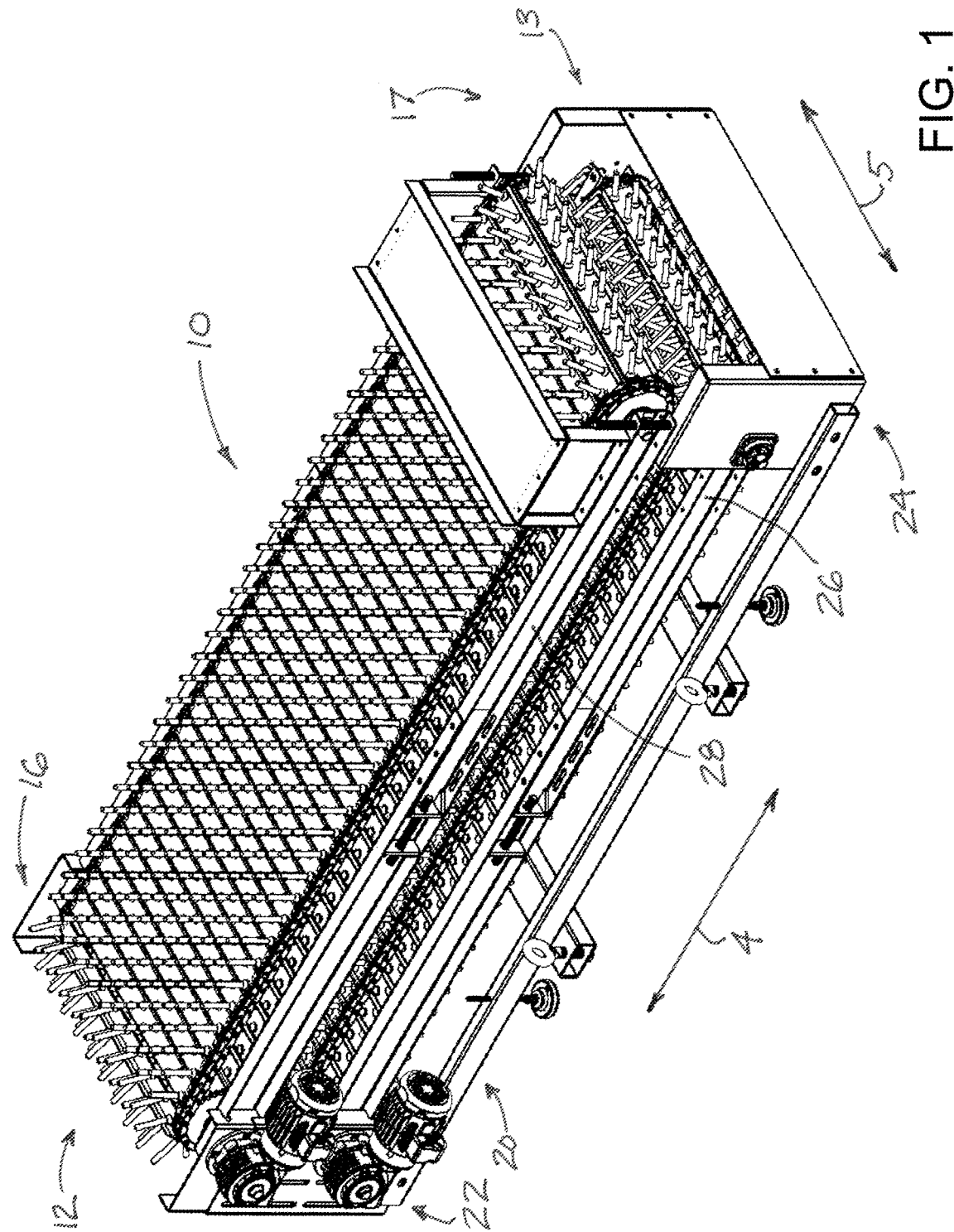
FIG. 1 is a schematic perspective view of the plant stripping apparatus of a new plant processing system with plant stripping capabilities, according to the present disclosure.
Figure 2:
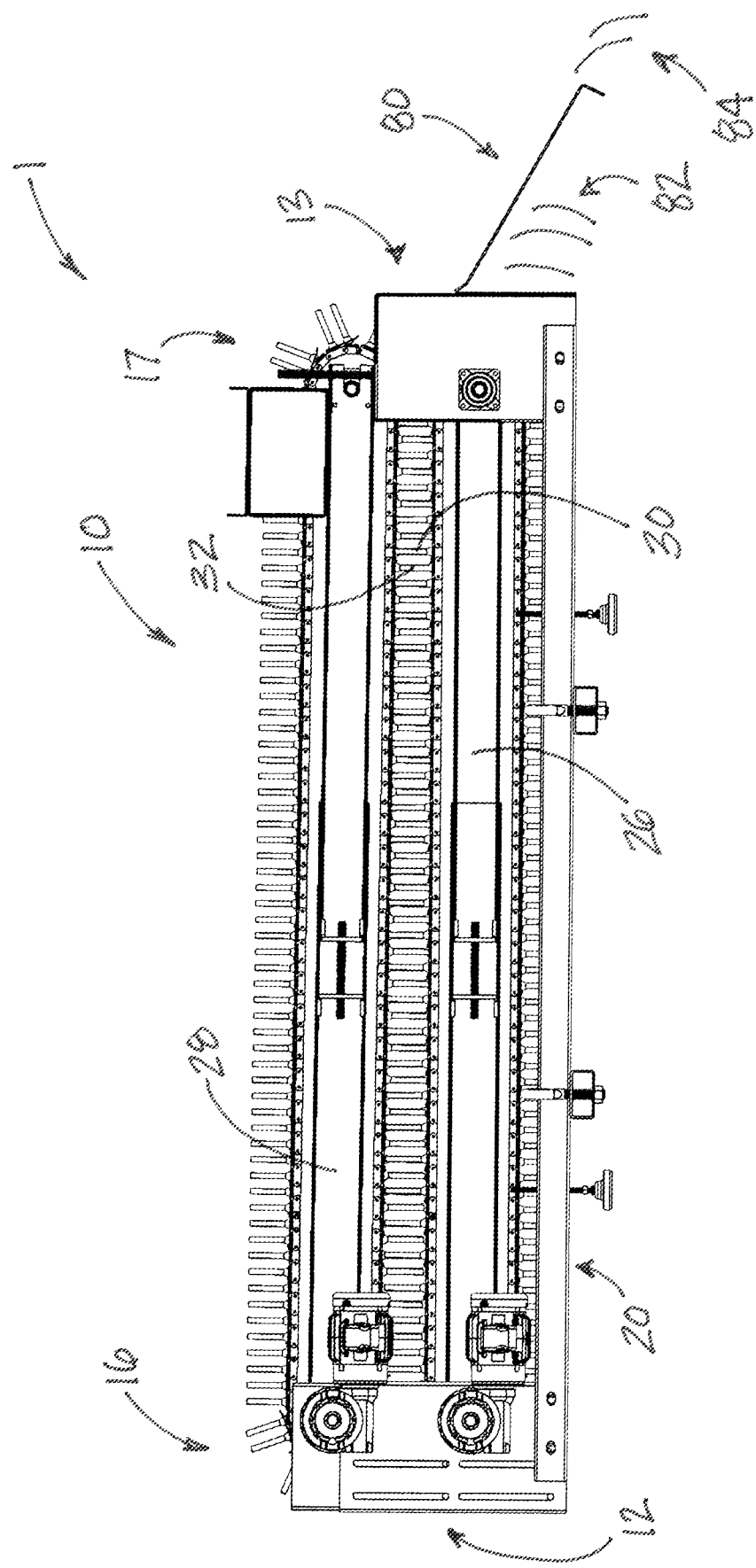
FIG. 2 is a schematic side view of the plant processing system, according to an illustrative embodiment.
Figure 3:
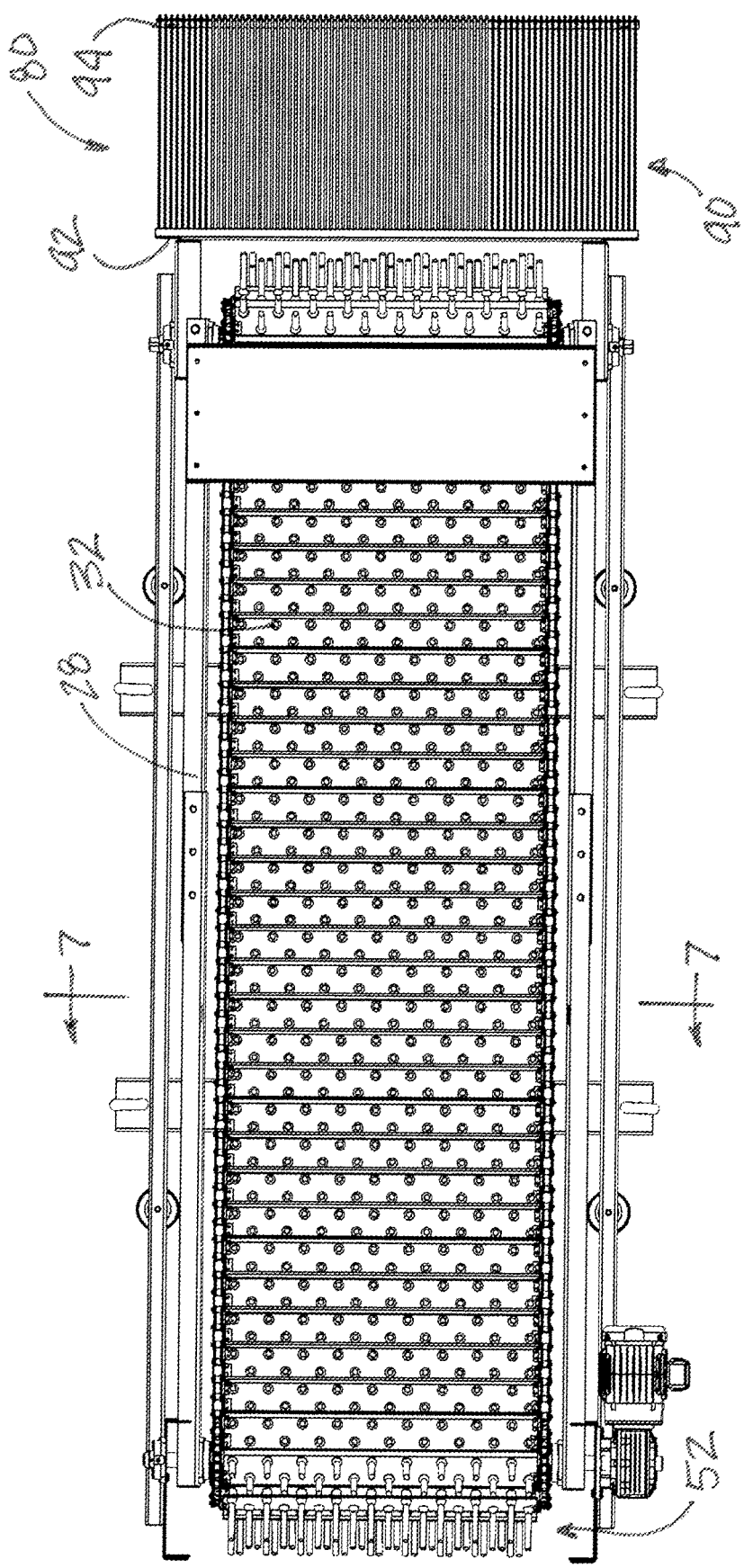
FIG. 3 is a schematic top view of the plant processing system, according to an illustrative embodiment.
Figure 4:
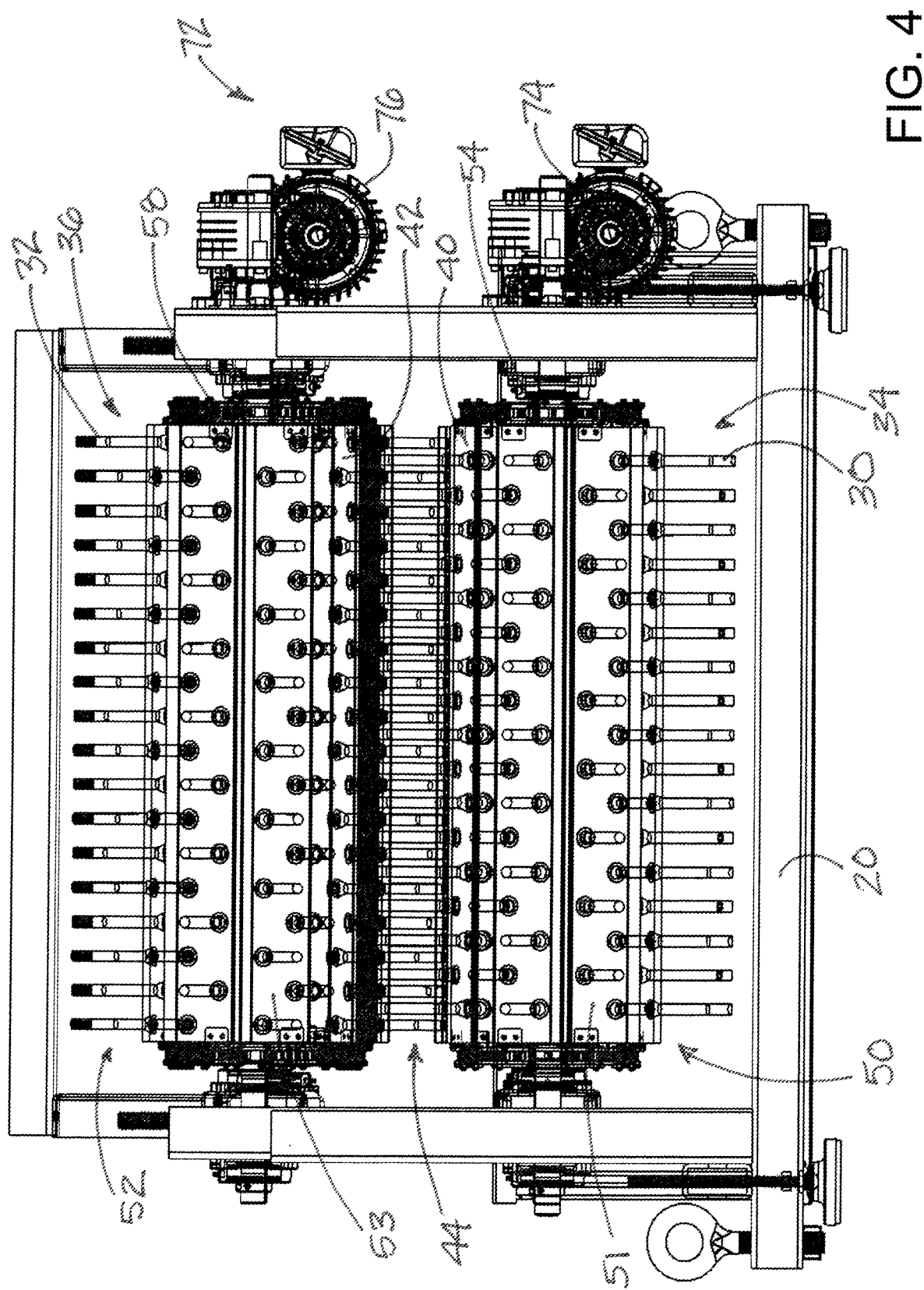
FIG. 4 is a schematic input end view of the plant processing system, according to an illustrative embodiment.
Figure 5:
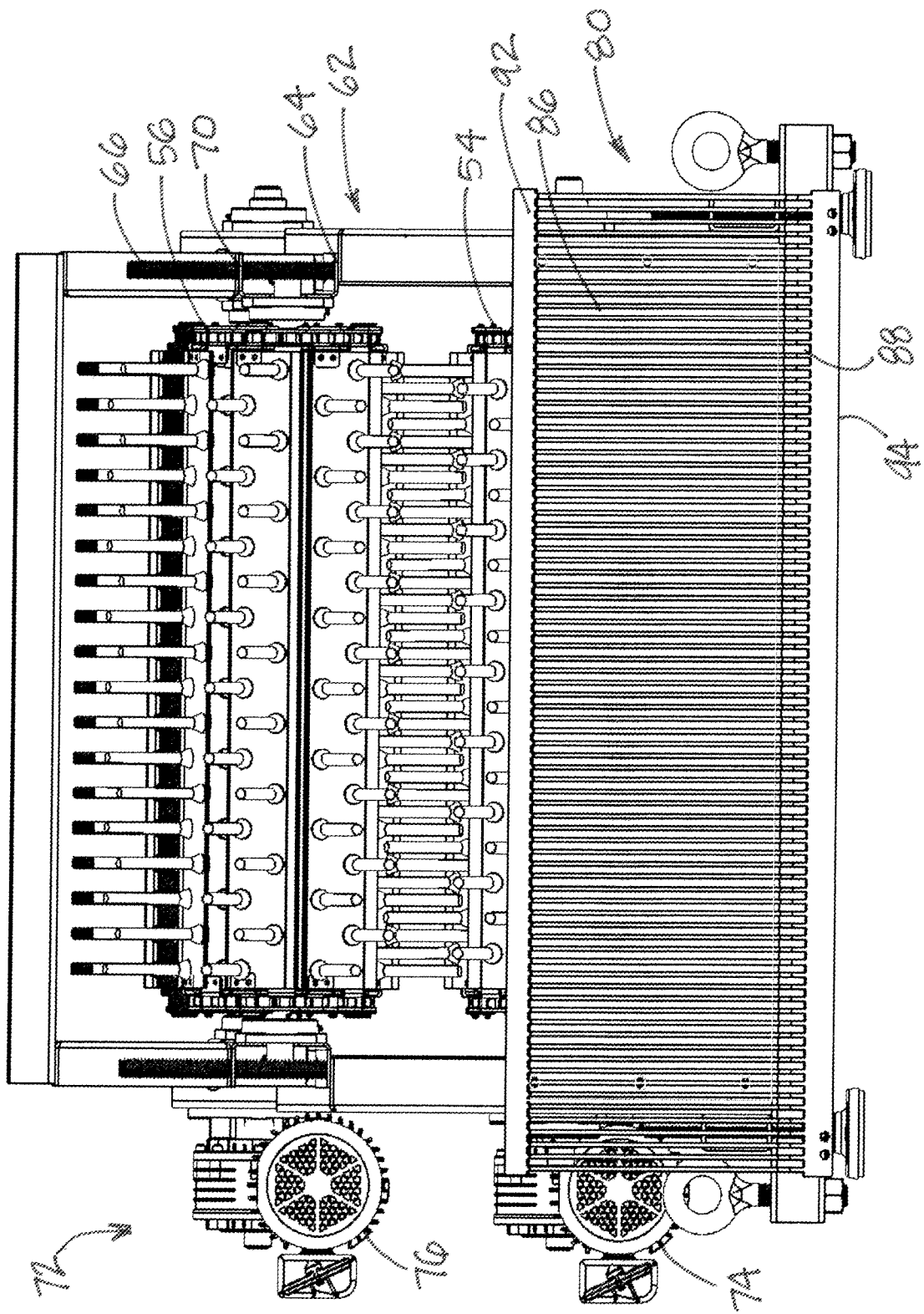
FIG. 5 is a schematic output end view of the plant processing system, according to an illustrative embodiment.
Figure 6:
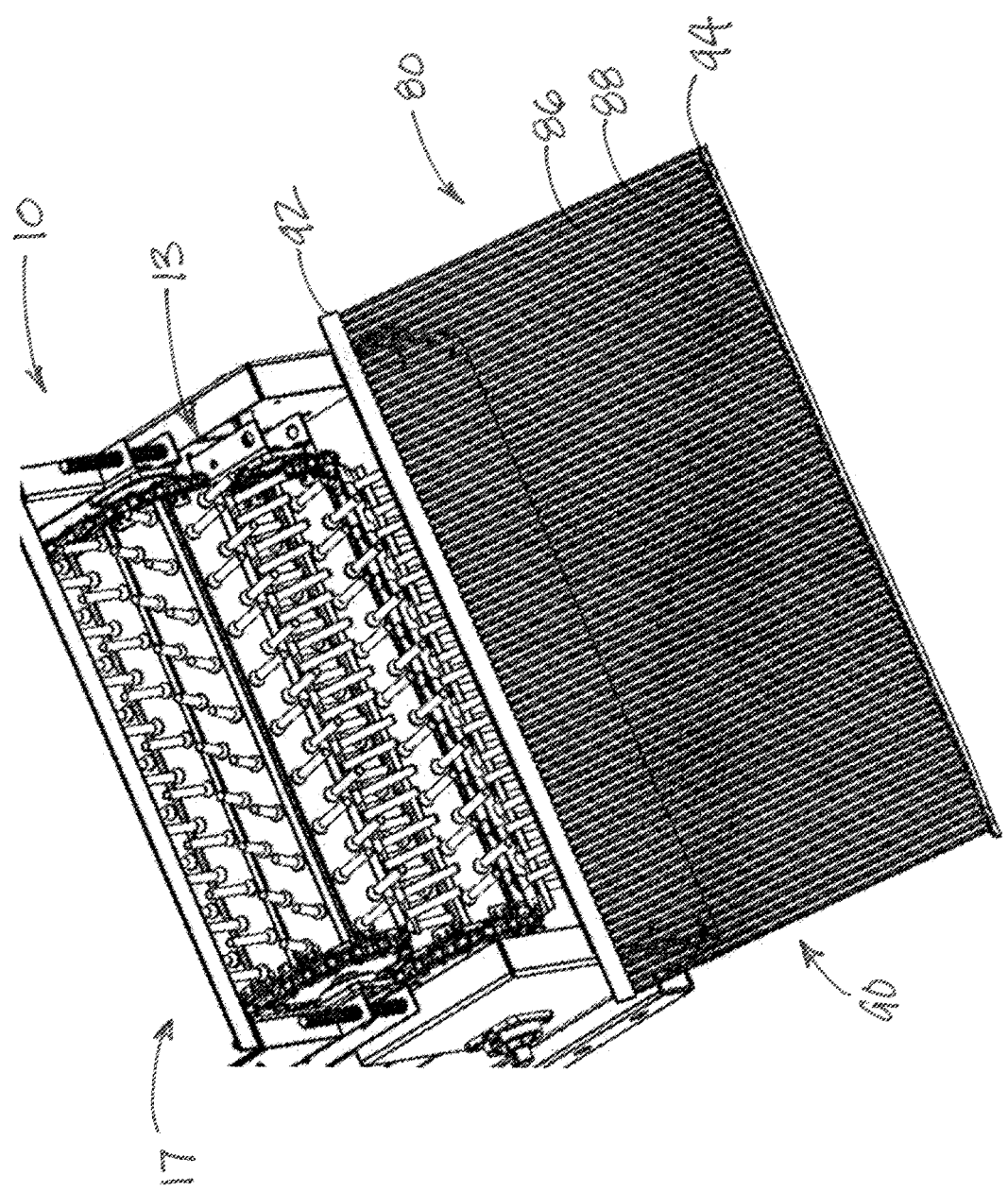
FIG. 6 is a schematic perspective view of a portion of the plant processing system, according to an illustrative embodiment.
Figure 7:
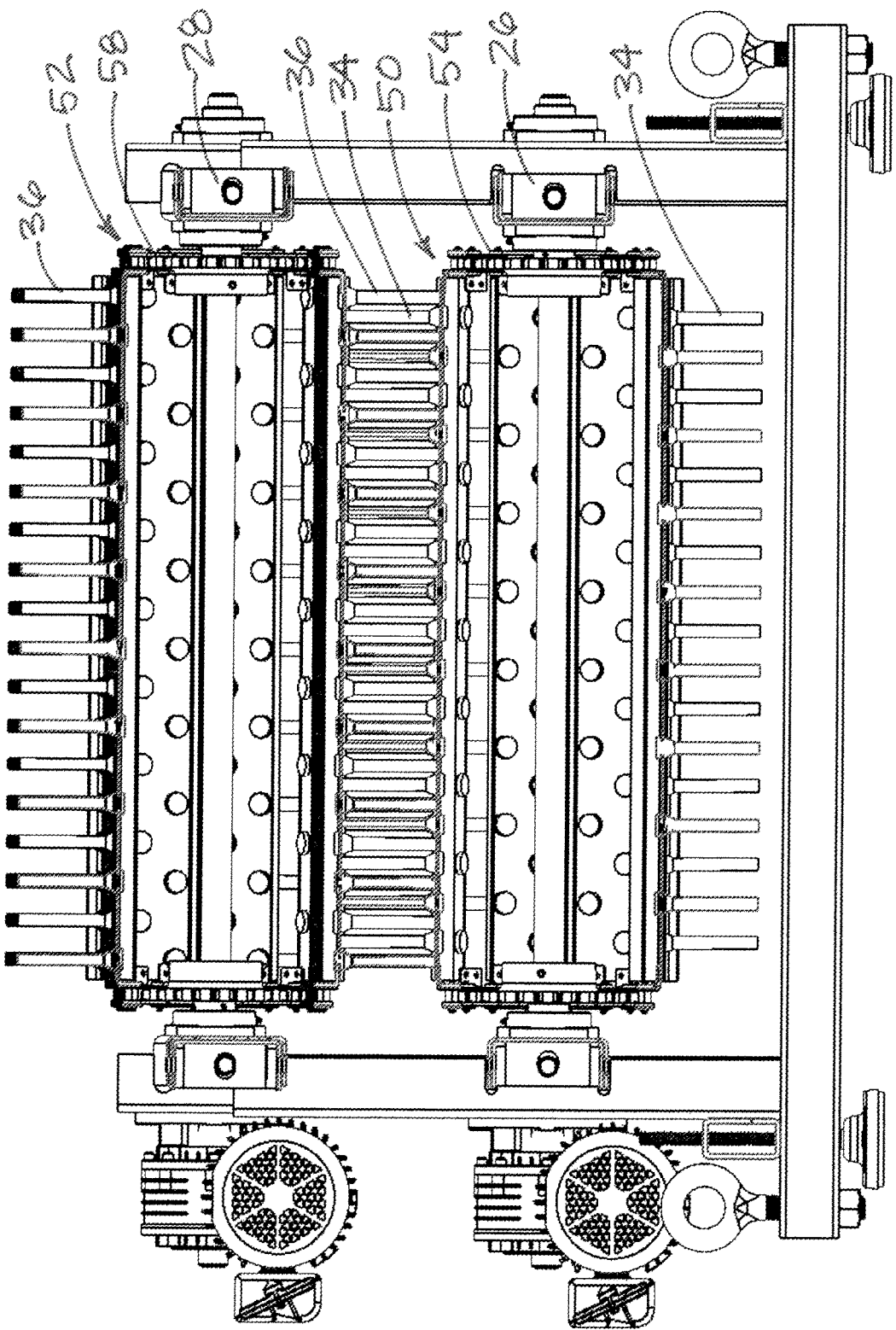
FIG. 7 is a schematic sectional view of the plant processing system taken along line 7-7 of FIG. 3, according to an illustrative embodiment.
Figure 8:
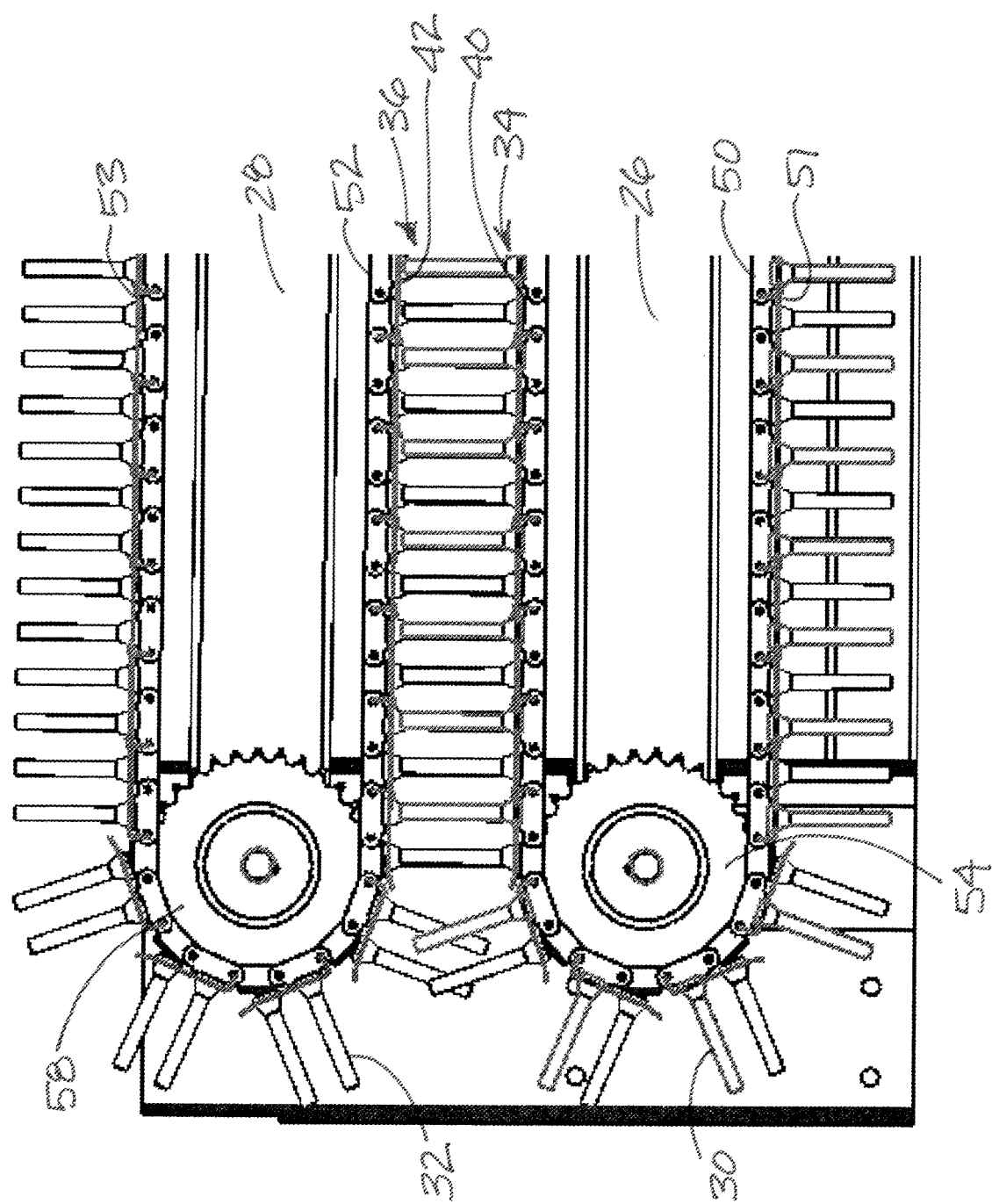
FIG. 8 is a schematic side view of an input end portion of the plant processing system, according to an illustrative embodiment.
Figure 9:
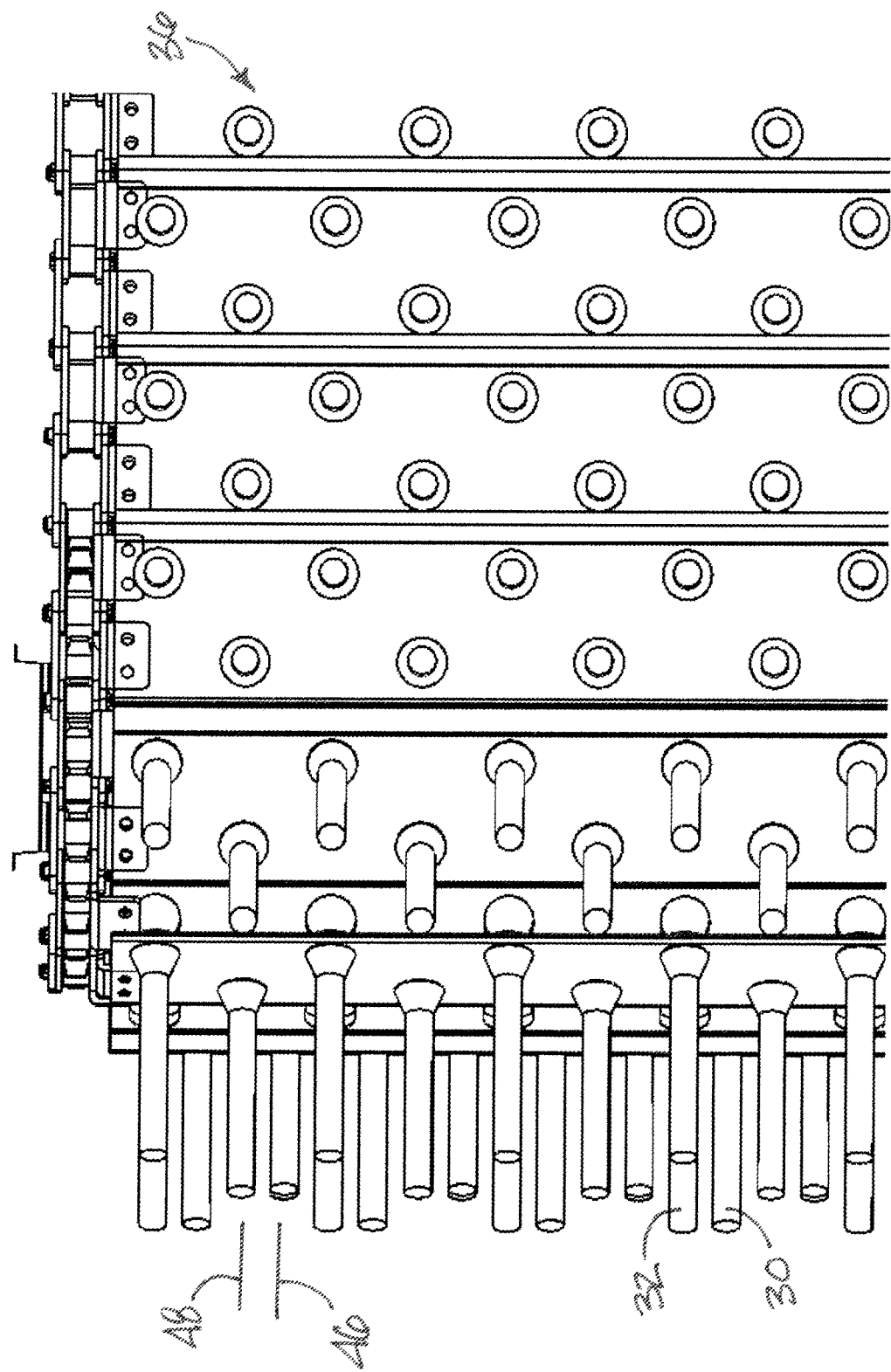
FIG. 9 is a schematic top view of a section of the input end portion of the plant processing system, according to an illustrative embodiment.
Figure 10:
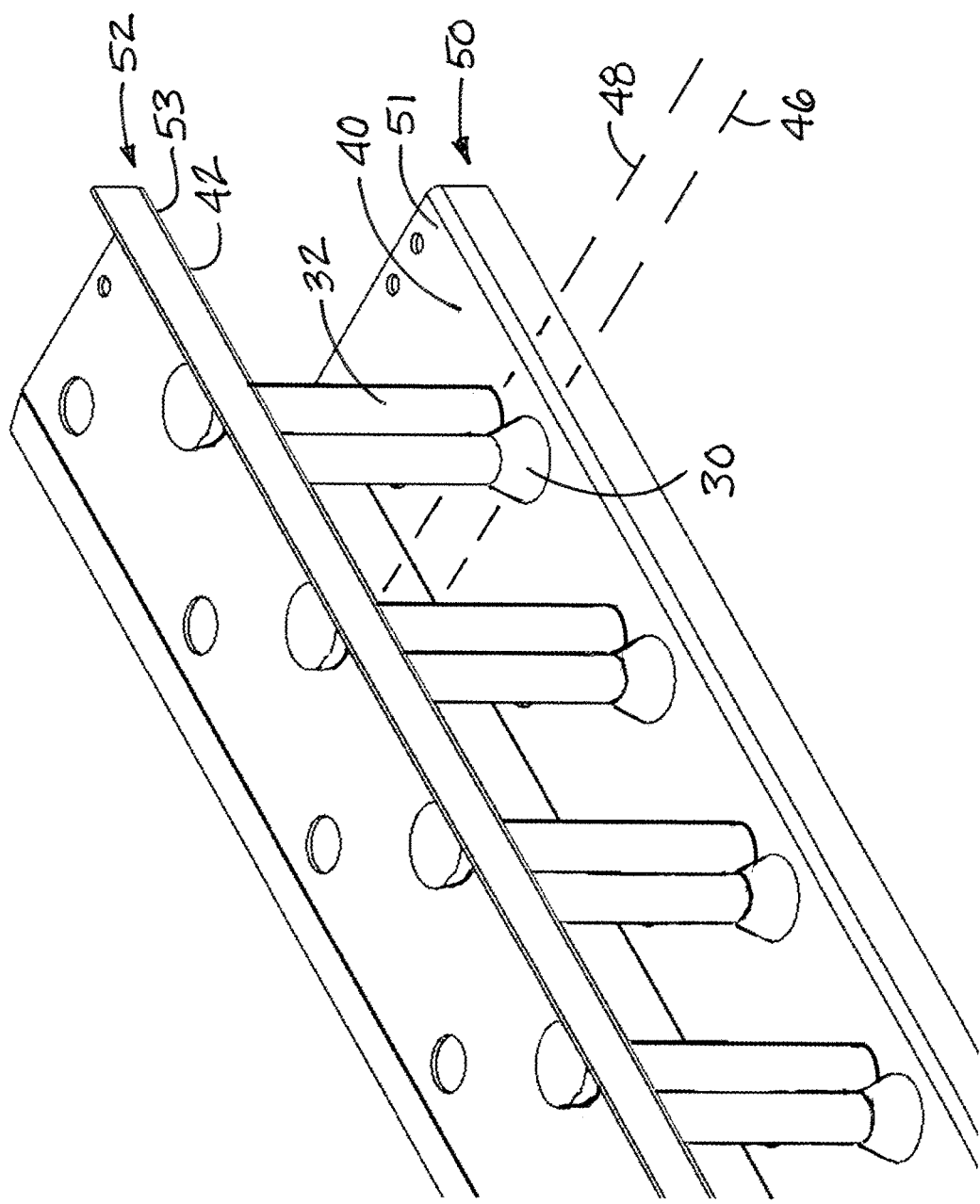
FIG. 10 is a schematic perspective view of isolated elements of the first and second belts showing the relationship of the fingers of the first and second groups of the stripping apparatus, according to an illustrative embodiment.
Figure 11:
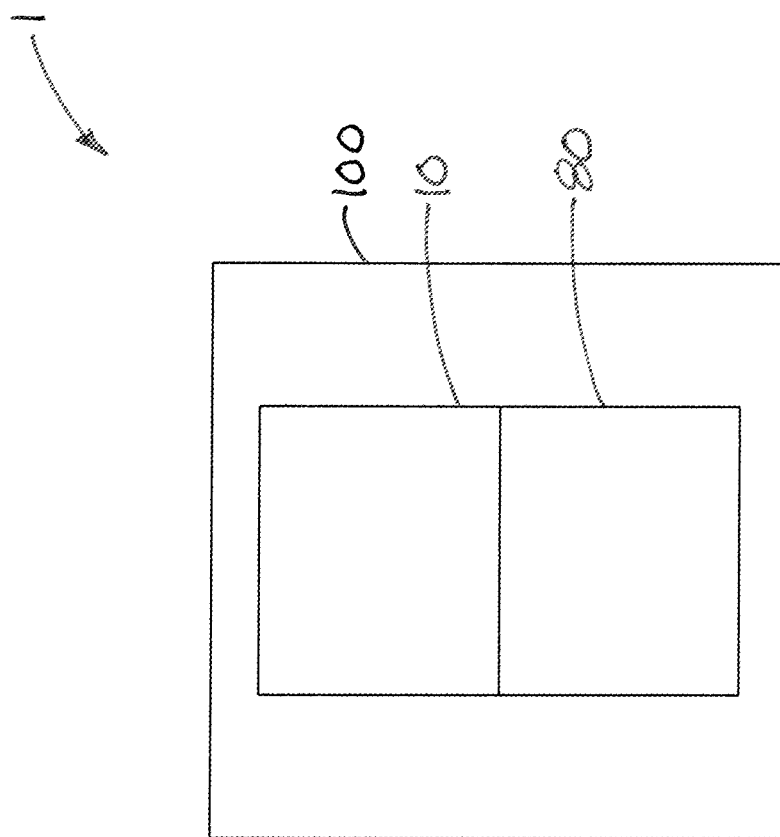
FIG. 11 is a schematic diagram of the system, according to an illustrative embodiment.

With reference now to the drawings, and in particular to FIGS. 1 through 36 thereof, a new plant processing system embodying the principles and concepts of the disclosed subject matter will be described.

The applicants have recognized that harvesting techniques that chop or grind the entirety of the plant into smaller pieces for further processing dilutes the constituent parts of the plant material that have higher levels of the extract or substance sought from the processing, with the constituent parts of the plant material that have lesser or no level of the desired extract. For example, for the extraction of cannabidiol (CBD) from cannabis plant material, chopping or grinding the whole plant creates a mixture of the plant buds which have a relatively higher CBD content with the stems and stalks of the plant material which have little if any CBD content. Thus, chopping the plant material into a mixture of the buds and the stems and stalks can greatly reduce the processing efficiency of the plant material for an extract such as CBD because the chopped mixture has a significant content of plant parts which yield little or no CBD.

As a result, the applicants have recognized that processing the plant in a substantially whole form to remove the parts of the plant material having significant levels of the desired extract from the parts of the plant material having insignificant levels of the desired extract is a highly preferable step in the overall processing of the plant material to obtain the extract. Such processing may include disassociating at least some constituent parts of the plant material from other constituent parts of the plant material by, for example, detaching at least some constituent parts of the plant material from other constituent parts. In the case of processing cannabis plant material to obtain CBD, this may include detaching the buds of the plant material from the stalks and stems of the plant material. The processing may further include separation of at least some of the constituent parts of the plant material from other constituent parts so that constituent parts with greater concentration or availability of the desired substance may receive further processing, such as grinding or milling, as well as other may techniques to obtain the desired extract. When processing cannabis plant material to obtain CBD, this may include separating the buds of the plant material from the stalks and stems of the plant material so that the buds can receive further processing to extract CBD.

In one aspect, the disclosure relates to a plant processing system 1 for processing plant materials. Suitable plant materials may have at least two different types of constituent parts which are attached together through the natural growing process of the plant. The plant materials may comprise a plant in the form or condition in which the plant vegetated prior to being removed from its location of vegetation, such as by severing the plant material from a root structure of the plant, although the plant material suitable for processing by the system may include the root structure. For the purposes of this description, the types of constituent parts of the plant material may be referred to as first plant parts and second plant parts which are attached together in their natural form. Typically, although not necessarily, the type of first plant parts may be more valuable or desirable than the type of second plant parts for extracting a desired substance from the plant material. Usually this difference in value between the constituent parts of the plant material is a result of at least one type of plant part having a relatively higher level of the desired substance and at least one (different) type of plant part having a relatively lower level (or in some cases trace or substantially zero levels) of the desired substance.

In the illustrative description of the disclosure, the plant material comprises a cannabis plant, such as of the cannabis indica species, and the constituent parts of the plant may include (but are not limited to) the buds and the stems or stalks. For the purpose of this description, the stalk may be considered to be a portion of the plant extending upwardly from the root structure and the stems may be considered to be portions the plant extending from the stalk. Other parts of the cannabis plant may also be processed, but may not be of significance to the processing due to not having a relatively high or relatively low content of the desired substance, or may form such a small portion of the whole plant that the processing (or not processing) of those parts is not significant to the efficiency of the process. Also in the illustrative description, at least one of the desired substances sought to be extracted from the plant material is cannabidiol (CBD), which is found in relatively higher levels in the buds of the cannabis plant material and in relatively lower levels, if at all, in the stems and stalks of the cannabis plant material. Thus, the buds of the cannabis plant may form the first plant parts of the constituent parts of the plant material and the stems and stalks of the cannabis plant may form the second plant parts of the constituent parts of the plant material.

The system 1 may include a plant stripping apparatus 10 which is configured to detach constituent parts of the plant material from each other, or otherwise remove the connection between at least some of the constituent parts of the plant material. The plant stripping apparatus 10 may have an input 12 generally configured to receive plant material in a substantially whole condition as the plant vegetated, although some degree of prior processing to the plant may have been performed. The apparatus 10 may also have an output 13 from which constituent parts of the plant material are dispensed from the apparatus 10 in a wholly or partially detached condition from each other. The apparatus 10 may be elongated in a longitudinal direction 14 along a longitudinal axis of the apparatus, and may also have a lateral direction 15 which is generally oriented substantially perpendicular to the longitudinal direction 14. The elongated apparatus 10 may have a first end 16 at which the input 12 may be located, and a second end 17 at which the output 13 may be located.

In greater detail, the plant stripping apparatus 10 may include a frame 20 which may be elongated and extend in the longitudinal direction 14 of the stripping apparatus. The frame may have an inboard end 22 located toward the input 12 and the first end 16, and an outboard end 24 located toward the output 13 and the second end 17, of the apparatus. The frame 20 may be comprised of a first subframe 26 and a second subframe 28, with the second subframe being positioned generally above the first subframe in some embodiments.

The plant stripping apparatus 10 may also include a plurality of stripping fingers 30, 32 which may include at least one group 34 of the stripping fingers which may be movable with respect to the frame 20 along a path of movement for the fingers. In some embodiments, including the illustrative embodiments, the path of movement follows an endless loop and may include at least one linear portion.

In some embodiments, the plurality of stripping fingers 30, 31 may comprise at least two groups of the stripping fingers, which may include a first group 34 of stripping fingers and a second group 36 of stripping fingers. Each group of stripping fingers may have a different path of movement. The groups of fingers may move relative to each other, and the groups of fingers may also move relative to the frame 20, although it is contemplated that some embodiments may have at least one group that does not move with respect to the frame along a path. The stripping fingers of the first group 34 may be oppositely oriented with respect to the fingers of the second group 36, and the fingers of the first and second groups may be oriented substantially parallel to each other. The groups of stripping fingers may move with respect to each other in a first direction which may be oriented substantially parallel to the longitudinal direction 14 of the apparatus, and each group may move relative to the frame in the first direction. In some embodiments, the fingers of the first group 34 may move faster in the first direction relative to the fingers of the second group 36 and relative to the frame 20.

The fingers of the first group 34 may extend from a first working surface 40 and the fingers of the second group 36 may extend from a second working surface 42. The first working surface 40 may be oriented in substantial opposition to the second working surface 42 such that the working surfaces face each other. A gap 44 may be formed between the first 40 and second 42 working surfaces, and the gap may form a pathway for movement of plant materials delimited by the working surfaces between the input 12 and output 13 of the stripping apparatus. The first 40 and second 42 working surfaces may be oriented generally parallel to each other such that a magnitude or width of the gap 44 is generally equal at the input 12 and output 13 of the apparatus 10, although variation in the width of the gap is possible and may be adjusted to enhance the stripping effectiveness of the apparatus 10.

In some embodiments, the stripping fingers may be formed of a material which exhibits a limited degree of resilient bending or flexing capability. Illustratively, the stripping fingers may be formed of a hard or stiff rubber (or other elastomeric) material. Less desirably, the stripping fingers may be formed of a rigid material which substantially prevents flexing or bending of the fingers during usage of the system.

In the illustrative embodiments, the second working surface 42 may be positioned above and over the first working surface 40, and the first and second working surfaces may be in general vertical alignment with each other such that the first working surface faces generally upwardly and the second working surface faces generally downwardly. The fingers of the first group 34 may extend generally upwardly from the first working surface 40 and the fingers of the second group 36 may extend generally downwardly from the second working surface 42. The upwardly extending fingers of the first group 34 and the downwardly extending fingers of the second group 36 may be positioned substantially adjacent to each other. Illustratively, fingers of the first group 34 may be positioned along a first longitudinal line 46 and fingers of the second group 36 may be positioned along a second longitudinal line 48 with each of the longitudinal lines being oriented substantially parallel to the longitudinal direction 14 of the apparatus 10.

In many embodiments, the fingers of the first group 34 may be positioned in a plurality of ranks each extending in the longitudinal direction 14 of the apparatus with the fingers of each rank being arranged along a separate first longitudinal line 46, and the longitudinal lines of the ranks may be laterally spaced from each other at a first lateral spacing and may be oriented substantially parallel to each other. Similarly, the fingers of the second group 36 may be positioned in a plurality of ranks each extending in the longitudinal direction 14 of the apparatus with the fingers of each rank being arranged along a separate second longitudinal line 48, and the longitudinal lines of the ranks may be laterally spaced from each other at a second lateral spacing and which are oriented substantially parallel to each other. Movement of the fingers of the first group may generally occur along the first longitudinal line 46 and movement of the fingers of the second group may generally occur along the second longitudinal line 48. The fingers of the first 34 and second 36 groups may also be arranged in rows which extend in the lateral direction (e.g., perpendicular to the longitudinal direction 14) between lateral sides of the respective working surfaces 40, 42.

The first longitudinal line 46 may be offset in the lateral direction 15 with respect to the second longitudinal line 48 such that the first lateral spacing and the second lateral spacing are offset from each other, and the fingers of the first group 34 are laterally offset from the fingers of the second group 36. Thus, movement of the fingers of the respective groups along the respective longitudinal lines may occur without any substantial contact or interference between the fingers of the respective groups.

The plant stripping apparatus 10 may further include at least one belt 50 on which at least one of the groups 34, 36 is mounted. The belt 50 may have a first surface 51 which may form a portion of the first working surface 40 from which the first group 34 of fingers extend. The first surface 51 may extend between the opposite lateral side edges 96, 97 of the belts 50, 52 that each extend in a longitudinal direction of the respective belt. In some embodiments, a pair of the belts may be utilized, and may include the first belt 50 and a second belt 52. Similar to the first belt 50 having the first surface 51 forming a portion of the first working surface, the second belt 52 may have a second surface 53 with a portion of the second surface forming the second working surface 42. The second belt 52 may be positioned over the first belt 52. Each of the belts 50, 52 may form an endless loop which may be elongated in shape, with one of the long stretches of the loop corresponding to the working surface provided by the respective belt. Illustratively, each of the belts 50, 52 may be formed of a chain of plates which are pivotally connected together to form the respective endless loops, and at least one stripping finger may be mounted on each of the plates. Each plate may be elongated in the lateral direction of the stripping apparatus 10 such that fingers from two or more ranks of the fingers from one of the groups 34, 36 may be located on the plate.

A pair of pulleys 54, 56 on which at least one of the belts is entrained may be included in the plant stripping apparatus 10. The pulleys 54, 56 may be mounted on the frame 20 at locations that are spaced in the longitudinal direction 14 of the apparatus 10. In greater detail, the pair of pulleys may include a leading pulley 54 which is positioned toward the input 12 of the stripping apparatus and a following pulley 56 which is positioned toward the output 13 of the apparatus 10. In some embodiments, the position of each pulley may be adjustable in a direction that is substantially perpendicular to the longitudinal and lateral directions of the apparatus 10 to permit adjustment of the magnitude of the gap 44 between the first 40 and second 42 working surfaces. Illustratively, each pulley may comprise a rotation shaft which is rotatably mounted on the frame, or respective subframe, and may also include a pair of sprockets which are mounted on the rotation shaft in laterally spaced locations on the shaft to engage the belt entrained on the pulley.

The pair of pulleys 54, 56 may comprise a first pair of pulleys which support the first belt 50, and a second pair of pulleys 58, 60 may support the second belt 52. The first pair of pulleys may be rotatably mounted on the first subframe 26 and the second pair of pulleys may be mounted on the second subframe 28. The positions of the leading 54 and following 56 pulleys of the first pair on the first subframe may be substantially fixed, while some degree of adjustment of the longitudinal spacing of the pulleys 54, 56 may be possible to adjust, for example, the tension applied to the first belt. Similar adjustment to the positions of the leading and following pulleys of the second pair on the second subframe may also be possible.

In some embodiments, the position of the following pulley 60 of the second pair may be movable in a direction toward and away from the following pulley 56 of the first pair, and such adjustment movement may be oriented substantially perpendicular to the first 40 and second 42 working surfaces of the respective belts to effectively adjust the magnitude or width of the gap 44 between the working surfaces. In use, the position of the following pulley 60 may be adjustable in a substantially vertical direction with respect to the position of the following pulley 56.

An adjustment assembly 62 may provide adjustment of the position of the following pulley 60 of the second pair of pulleys with respect to, for example, the following pulley 56 of the first pair of pulleys. The adjustment assembly 62 may be configured to adjust the position of the second subframe 28 with respect to the first subframe 26 to produce the adjustment of the positions of the respective following pulleys. In some embodiments, the adjustment assembly 62 may include an adjustment actuator 64 which is mounted on one of the subframes and engages the other one of the subframes. In the illustrative embodiments, the adjustment actuator is mounted on the first subframe and engages the second subframe, although an opposite arrangement may be utilized. The adjustment actuator 64 may include a rod 66 having a threaded exterior. The threaded rod may be actuated, or rotated, using any suitable structure which may be manually or automatically operated, such as by, for example, a manual crank or knob, or in some embodiments, an automatic actuating motor which is configured to selectively rotate the rod. The adjustment assembly 62 may also include an actuating mount 70 which is mounted on the other one of the subframes from the adjustment actuator, such as the second subframe. The actuating mount may define a threaded passage formed therein for receiving a portion of the rod such that rotation of the threaded rod tends to move the actuating mount toward and away from the first subframe.

In still other embodiments, the following pulley 60 may be biased toward the following pulley 56 in a manner that does not necessarily rigidly hold and maintain the positions of the pulleys, and thus the magnitude of the gap 44. For example, the position of the following pulley 60 may "float" by providing a flexible support of the second subframe 28 toward the outboard end 24 of the frame so that the second subframe is able to raise and lower with respect to the first subframe under the influence of, for example, the plant material moving along the pathway between the working surfaces.

The apparatus 10 may also include a movement assembly 72 for moving at least one of the groups of the stripping fingers with respect to the frame 20, and with respect to the other group of stripping fingers. Illustratively, the movement assembly 72 may include at least one motor 74 which is configured to rotate one of the belts, and a motor may be provided for moving each of the belts 50, 52. A first motor 74 may be configured to rotate the first belt and may be mounted on the first subframe, and a second motor 76 may be configured to rotate the second belt 52 and may be mounted on the second subframe. In the illustrative embodiments, each motor is engaged with the leading pulley of the respective pair of pulleys, although other driving arrangements could be utilized.

Significantly, the motor 74, 76 may be operated such that the respective belts, and thus the respective groups of stripping fingers, move or rotate along the path at different speeds relative to the frame. In some highly preferred implementations, the speed of movement of the second belt along its path is relatively faster than the speed of movement of the first belt along its path. The difference in speed of the belts may produce a shearing effect on the plant material and detachment of the constituent parts of the plant material from each other. For example, in the case of cannabis plant material, the buds are detached from the stalks and stems, and the stalks and stems may remain attached to each other but are typically not ground or pulverized into much smaller pieces than the form the stalks and stems had in the whole plant. Operation of the belts of the apparatus at a speed differential may result in the lower first belt (and the stripping fingers thereon) tending to move the plant material along the pathway between the input and output, while the upper second belt (and the stripping fingers thereon) tending to apply a shearing or tearing force to the plant materials carried by the fingers of the lower belt, which may tend to detach the constituent parts of the plant material from each other.

The plant processing system 1 may additionally include a plant parts separating apparatus 80 which receives plant material from the output 13 of the plant stripping apparatus to separate constituent parts of the plant material that have been detached from each other by the stripping apparatus 10. Thus, the separating apparatus 80 may be configured to separate the first plant parts of the plant material from the second plant parts which is useful in a processor apparatus in which, for example, some plant parts will receive further processing while other plant parts will not, or some plant parts will receive processing different from other plant parts. The separating apparatus 80 may thus create at least one stream 82 of the constituent parts of the plant material, and in the illustrative embodiment creates a pair of streams 82, 84 of the constituent parts. Illustratively, a first stream 82 includes the first plant parts of the plant material and a second stream 84 includes the second plant parts of the plant material.

The separating apparatus 80 of the illustrative embodiments may define a plurality of apertures 86 in a surface 88 over which the plant material from the output 13 of the apparatus passes, and the apertures 86 may have sizes and shapes which are configured to allow some plant parts to pass through the apertures while other plant parts are resisted or blocked from passing through the apertures. In the illustrative embodiments, plant parts passing through the apertures form the first stream 82 and plant parts that do not pass through the apertures but continue to pass over the surface 88 of the apparatus 80 form the second stream 84.

Illustratively, the separating apparatus 80 may include a grate 90 which defines the plurality of apertures 86 and extends from the output 13 of the plant stripping apparatus 10. The grate 90 may have a first end 92 which is positioned adjacent to the output 13 and a second end 94 which is opposite of the first end 92 such that plant material from the output 13 moves generally from the first end 92 toward the second end of the grate. The grate 90 may also define the surface 88 between the first 92 and second 94 ends.

The plant processing system 1 may also include a mobile base 100 on which elements of the system may be mounted, such as the plant stripping apparatus 10 and the separating apparatus 80. For example, in some implementations the mobile base 100 may comprise a vehicle having harvesting capabilities for severing or otherwise detaching plant material from the ground in which the plant material vegetated, and elements of the system 1 may be incorporated in the vehicle to directly receive the harvested plant material. In other implementations, the mobile base 100 may comprise a towable platform or trailer that may be towed behind a vehicle which may have harvesting capabilities such that the elements of the system 1 are able to receive the plant materials from the vehicle for processing as set forth in this disclosure.

Figure 12:
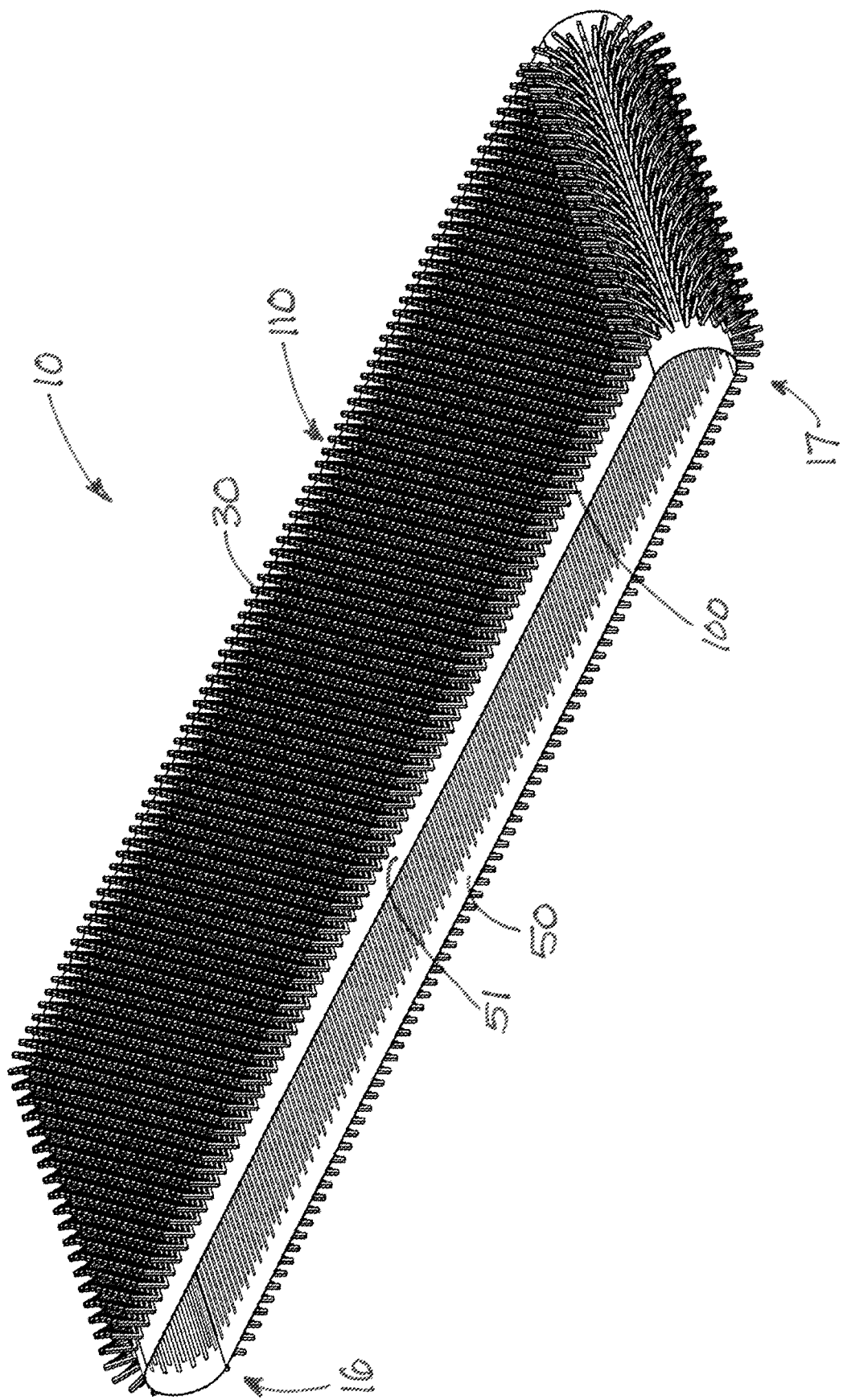
FIG. 12 is a schematic perspective view of an illustrative embodiment of one of the belts of the plant stripping apparatus utilizing notched cleats.
Figure 13:
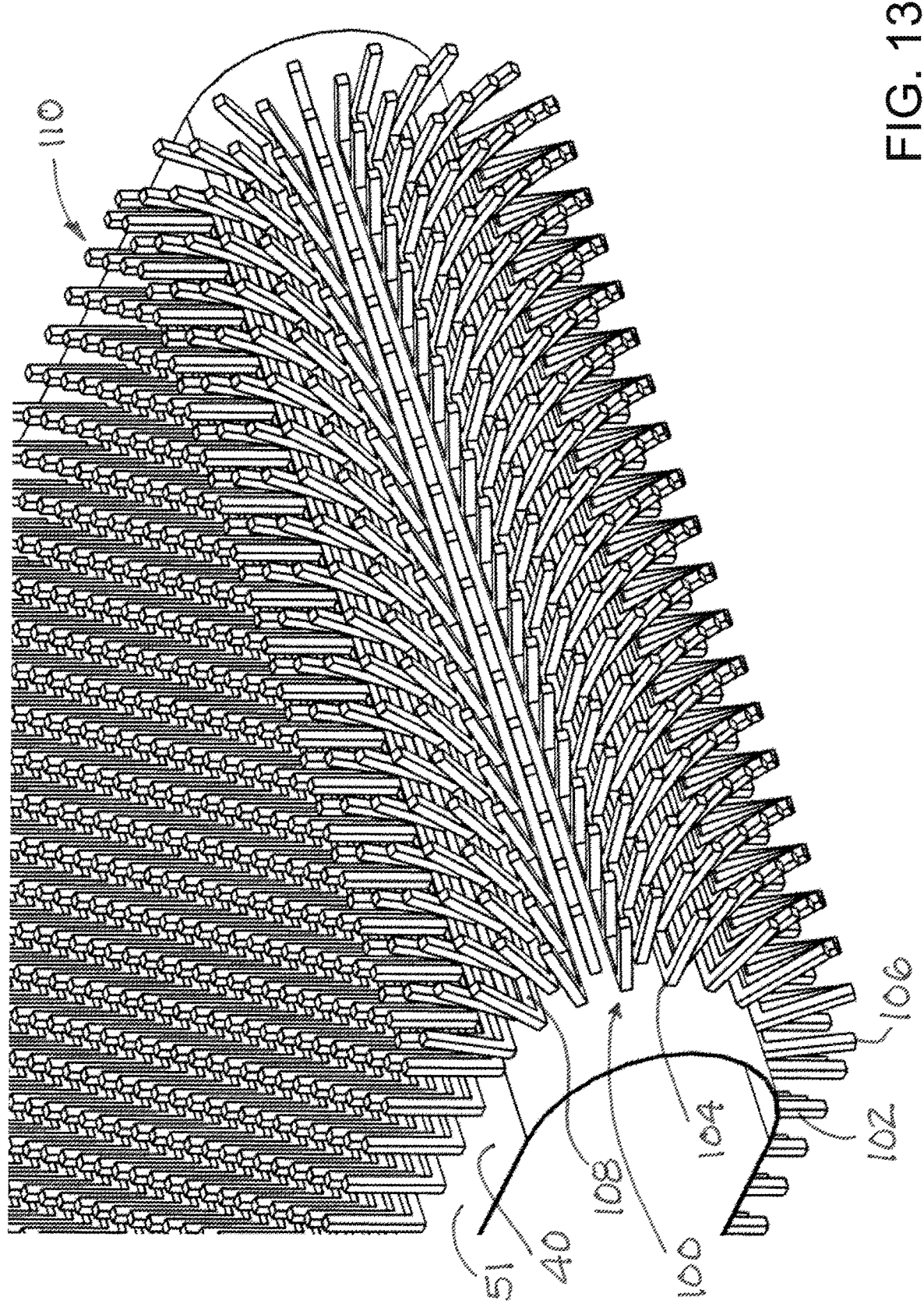
FIG. 13 is a schematic perspective view of an end portion of the illustrative embodiment of the belt of the plant stripping apparatus of FIG. 17.
Figure 14:
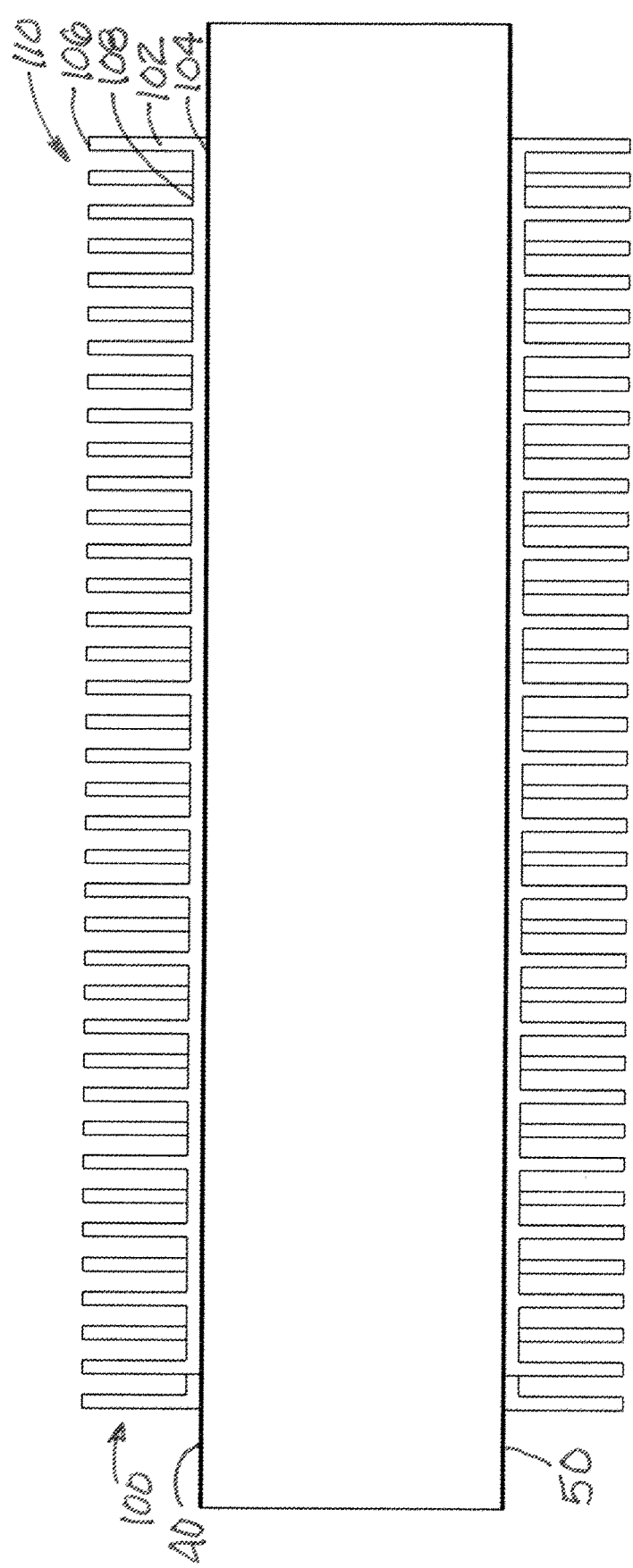
FIG. 14 is a sectional view taken along a lateral plane of the illustrative embodiment of the belt of the plant stripping apparatus of FIG. 17.
Figure 15:
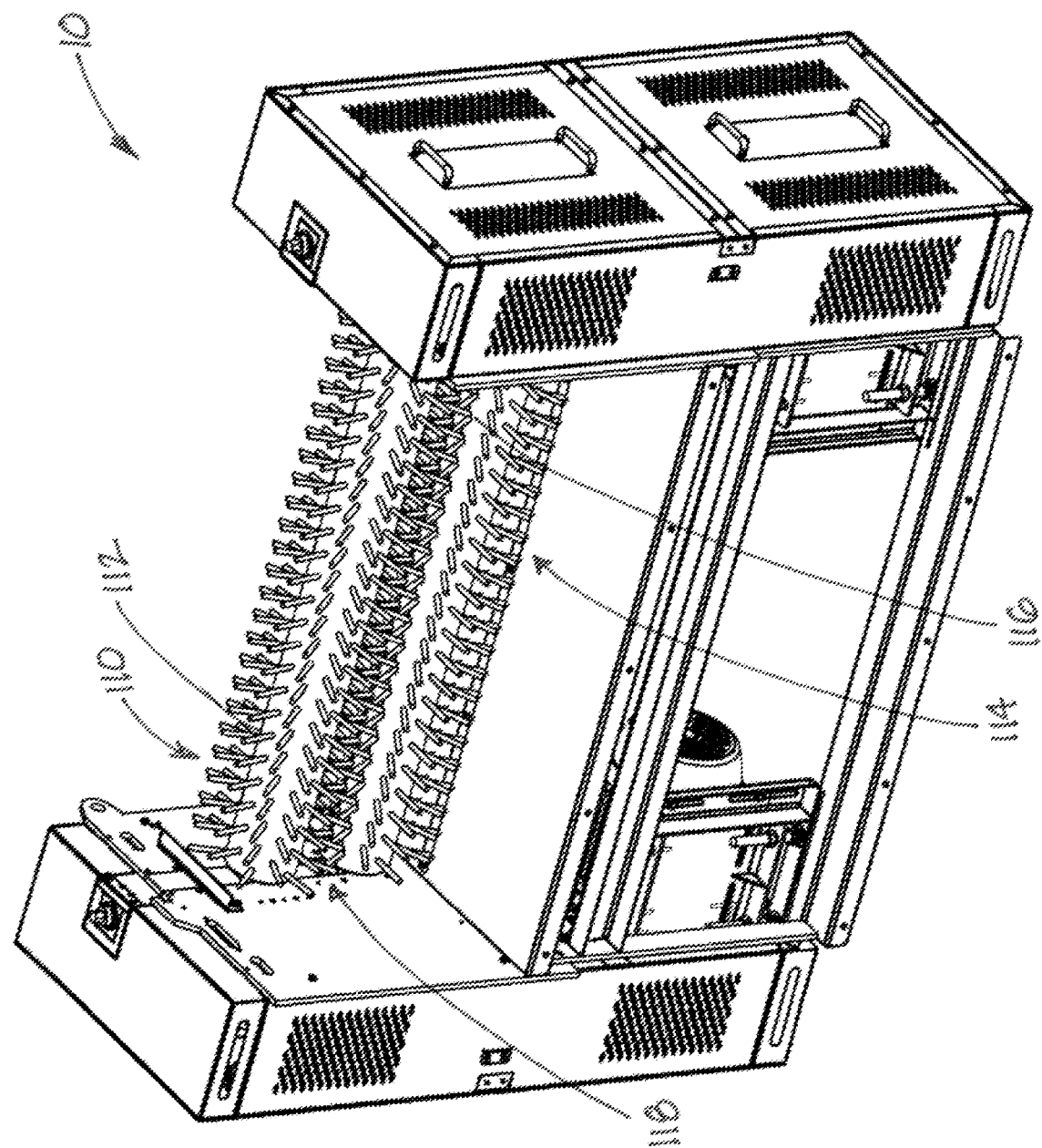
FIG. 15 is a schematic perspective view of an illustrative embodiment of the stripping apparatus utilizing a pair of rolls with stripping fingers.
Figure 16:
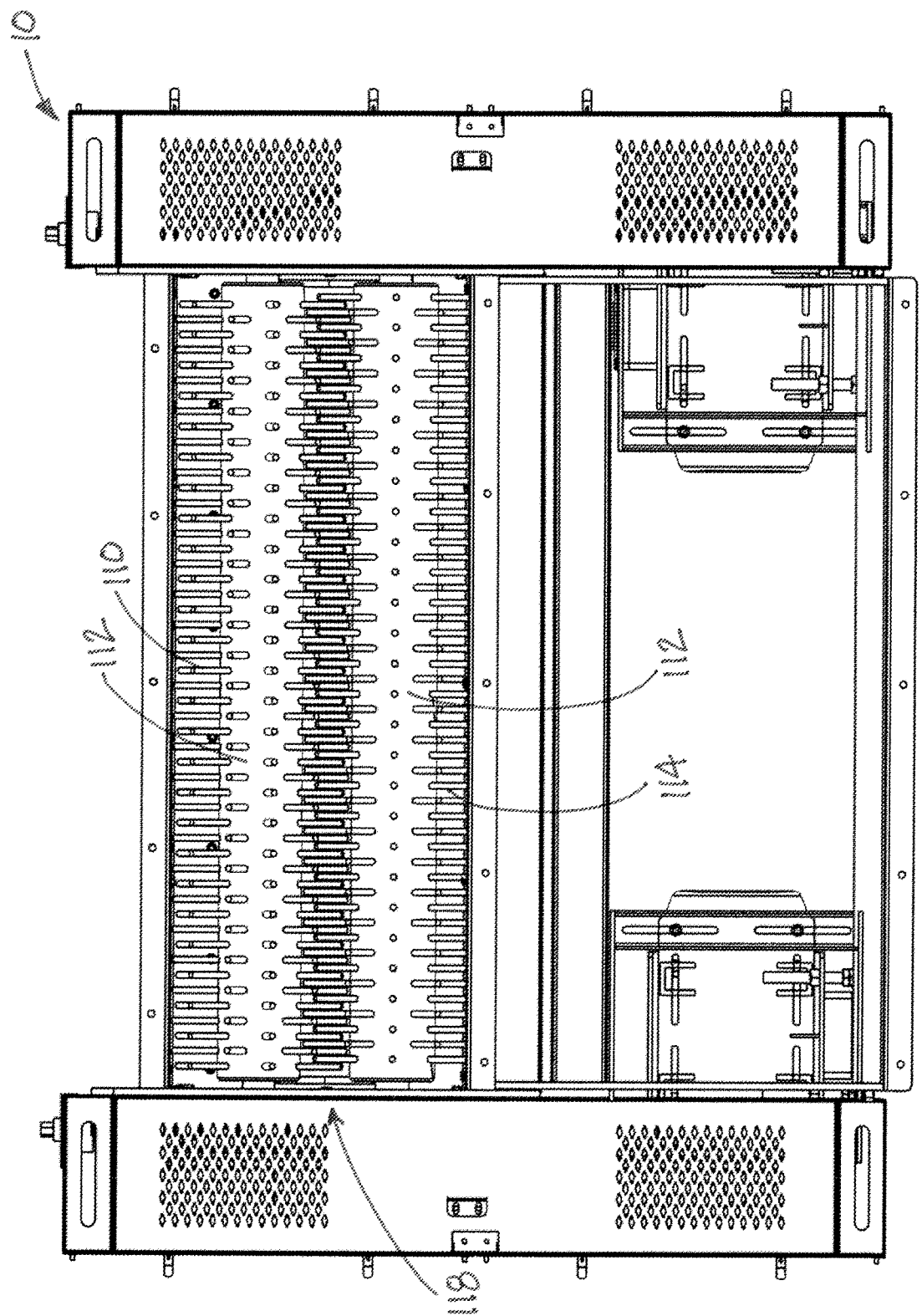
FIG. 16 is a schematic end view of an illustrative embodiment of the stripping apparatus utilizing the pair of rolls with stripping fingers as shown in FIG. 20.
Figure 17:
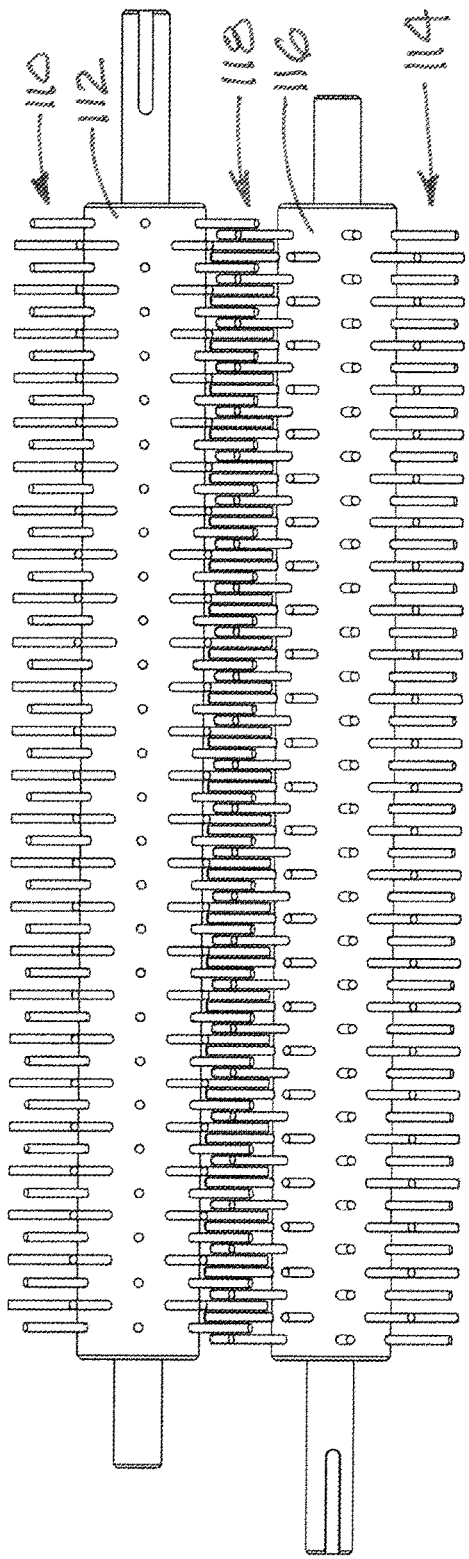
FIG. 17 is a schematic side view of the pair of rolls with stripping fingers utilized in the illustrative embodiment shown in FIG. 20.
Figure 18:
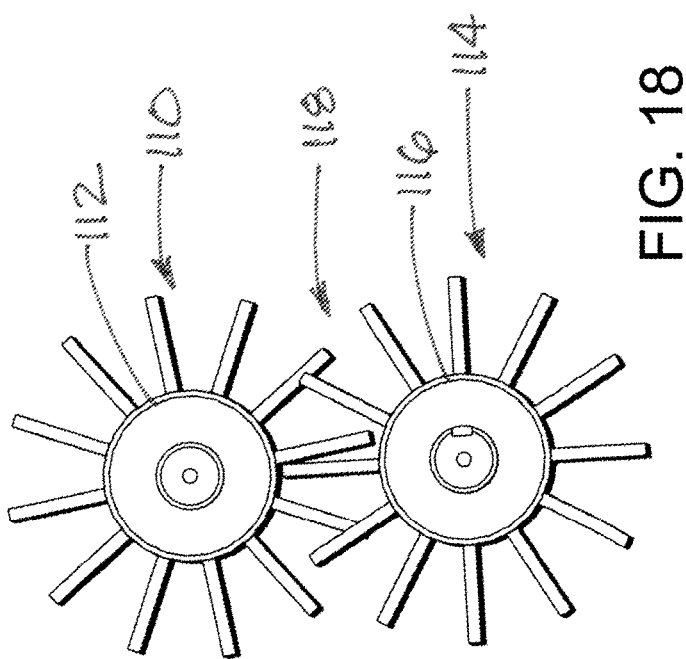
FIG. 18 is a schematic end view of the pair of rolls shown in FIG. 22.

In embodiments of the system 1 having optional configurations, such as is shown in FIGS. 12 through 14, the plurality of stripping fingers may be formed by a plurality of cleats 100 which are formed on at least one, and may be formed on each, of the belts 50, 52. Each of the cleats 100 may extend transversely with respect to the length of the belt, and may extend between the lateral side edges 96, 97 of the belt. The cleats may be spaced from each other in the longitudinal direction 14 of the plant part stripping apparatus. Each of the cleats 100 may comprise a wall 102 which may extend laterally with respect to the belt and may protrude from the first surface 51 of the belt. The wall 102 of each cleat 100 may extend from a base 104 of the wall at the first surface 51 to a tip edge 106 of the wall located opposite of the base 104. Illustratively, the cleats 100 may be integrally formed with the belt.

At least one, and preferably all, of the cleats 100 may have a plurality of notches 108 formed in the wall 102 of one or more of the cleats 100 at spaced locations along the width of the cleat and in spaced relation to each other to thereby form fingers which are separated by the notches. Illustratively, the notches 108 may be formed in the cleat by removing, such as by cutting away, a portion of the wall of the cleat such that the remaining portions of the cleat on the belt form the fingers. In some embodiments, a portion of the wall 102 toward the base 104 of the wall may extend between the adjacent fingers formed by the notched cleat. The notches 108 in the wall of a cleat may be laterally offset from notches in an adjacent cleat on the belt such that the fingers formed on the adjacent cleats are laterally offset from each other. Further, the positions of the fingers formed by the cleats on one (e.g., the first) belt may be laterally offset from the fingers formed by the cleats on another (e.g., the second) belt to provide arrangements and relationships between the fingers of the belts described in this disclosure.

In other embodiments, such as those illustratively shown in FIGS. 15 through 18 of the drawings, a first group of fingers 110 may extend from a first roll 112 in opposition to a second group of fingers 114 which extend from a second roll 116. The base portion of each of the rolls may have a substantially cylindrical outer surface from which the fingers extend in a generally radially outward direction. The first 112 and second 116 rolls may be spaced from each other such that the first 110 and second 114 groups of fingers extend into a gap 118 formed between the outer surfaces of the first and second rolls. The first and second rolls may rotate about substantially parallel axes such that the gap 118 may be substantially uniform in width between the rolls across the length of the gap. The positions of the fingers 110 of the first group may be offset in a direction parallel to the rotational axis of the first roll with respect to fingers 114 of the second group such that the fingers of the respective groups do not typically come into contact with each other. The width of the gap 118 may be adjustable to adjust the degree of interdigitation of the fingers of the first and second groups. Optionally, the first 112 and second 116 rolls may be rotatable at different rotation speeds to move the first and second groups of fingers through the gap 118 at different speeds relative to each other to facilitate a stripping action or effect on plant material passing through the gap. Separate motors may rotate the first and second rolls to provide individual rotational speed control for the rolls. As a further option, a plurality of pairs of first and second rolls may be utilized in a series to progressively strip the parts of the plant material.

Figure 19:
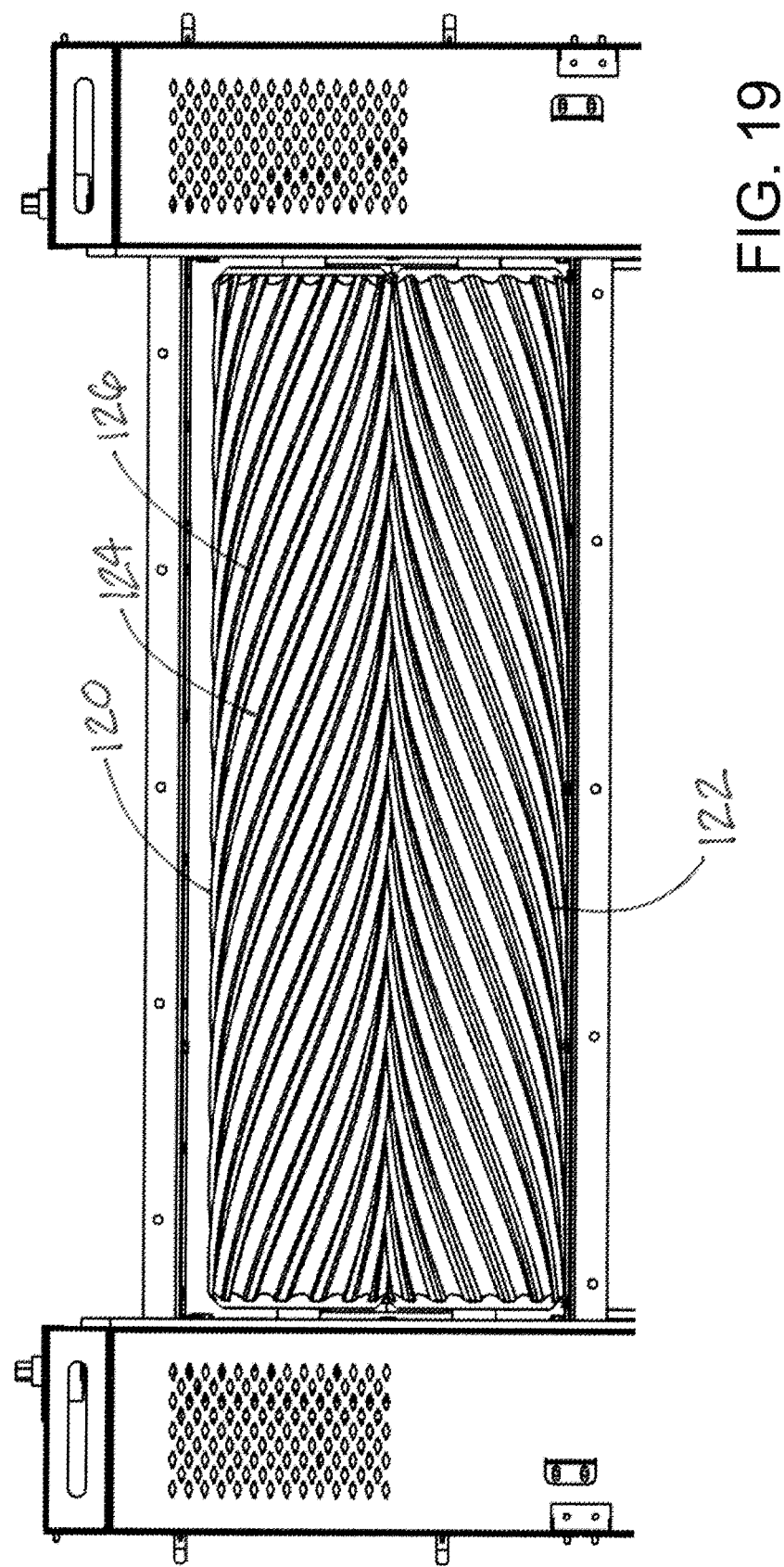
FIG. 19 is a schematic perspective view of an illustrative embodiment of the stripping apparatus utilizing a pair of rolls with stripping ribs.
Figure 20:
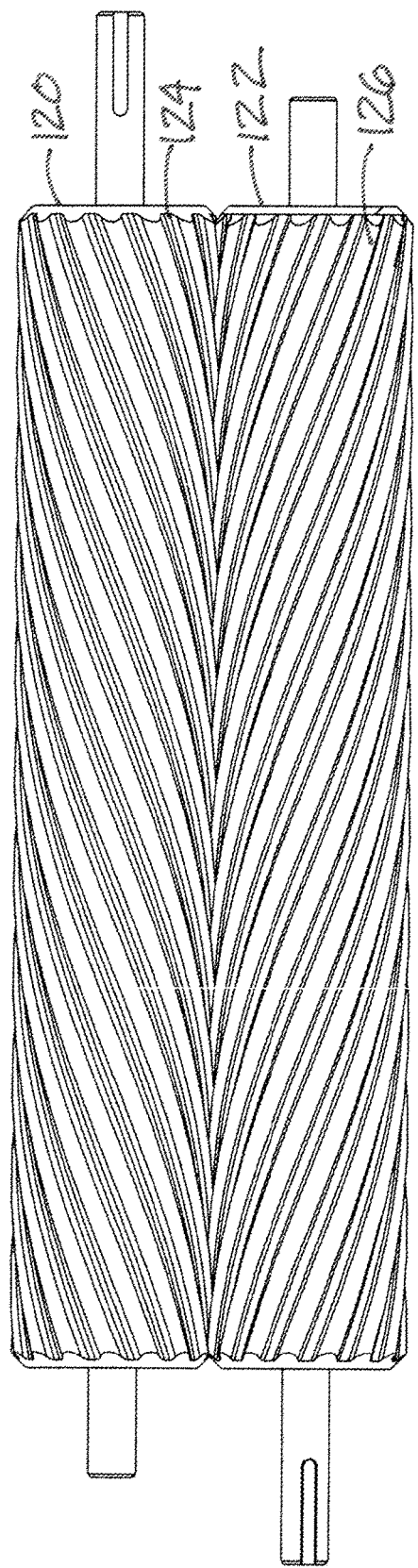
FIG. 20 is a schematic side view of the pair of rolls with stripping ribs utilized in the illustrative embodiment shown in FIG. 24.
Figure 21:
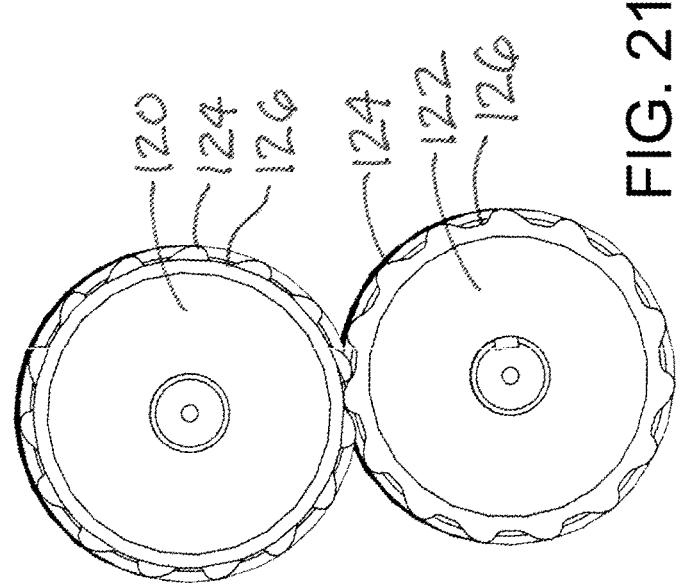
FIG. 21 is a schematic end view of the pair of rolls shown in FIG. 24.
Figure 22:
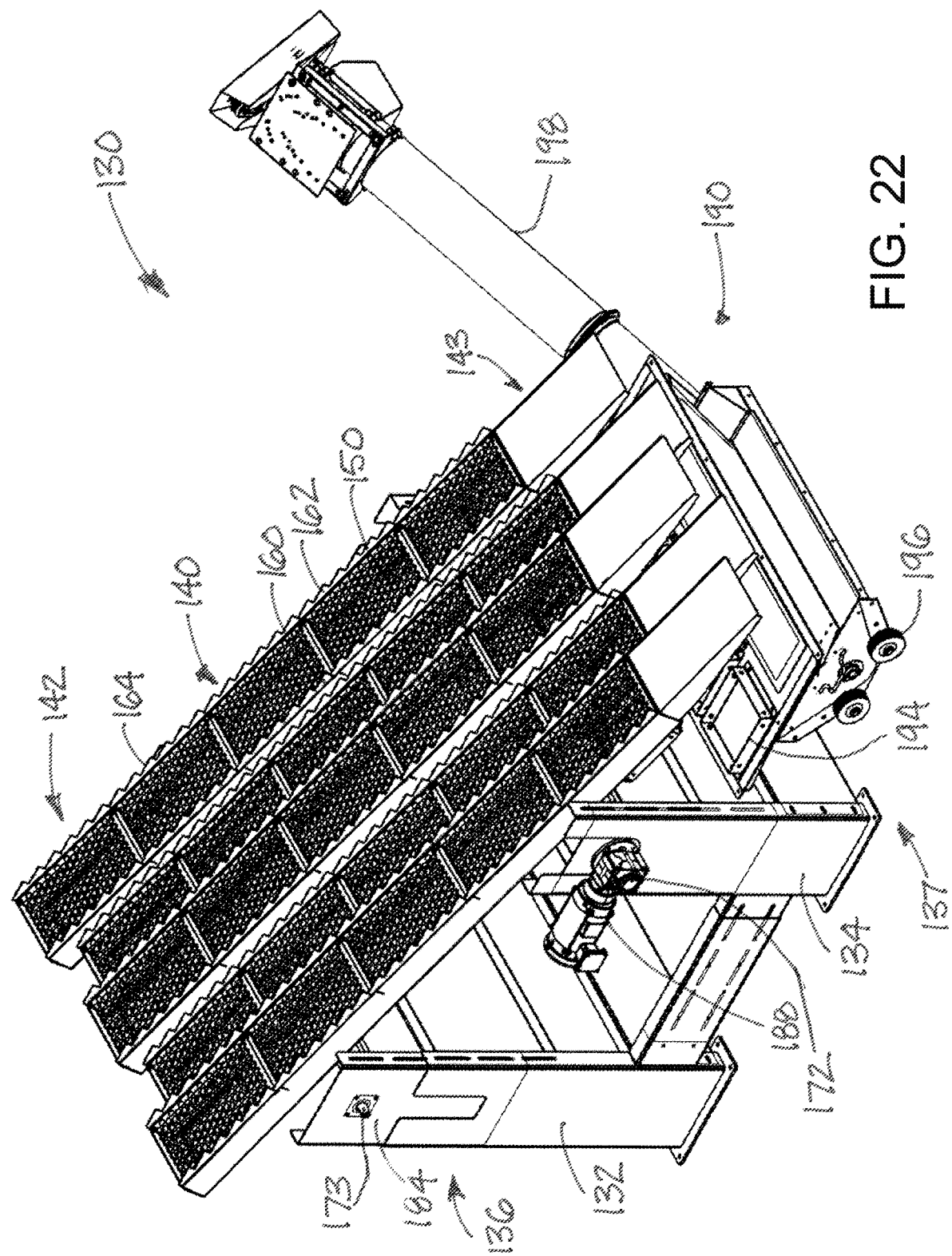
FIG. 22 is a schematic perspective view of an illustrative embodiment of a separating apparatus of the system of the disclosure.
Figure 23:
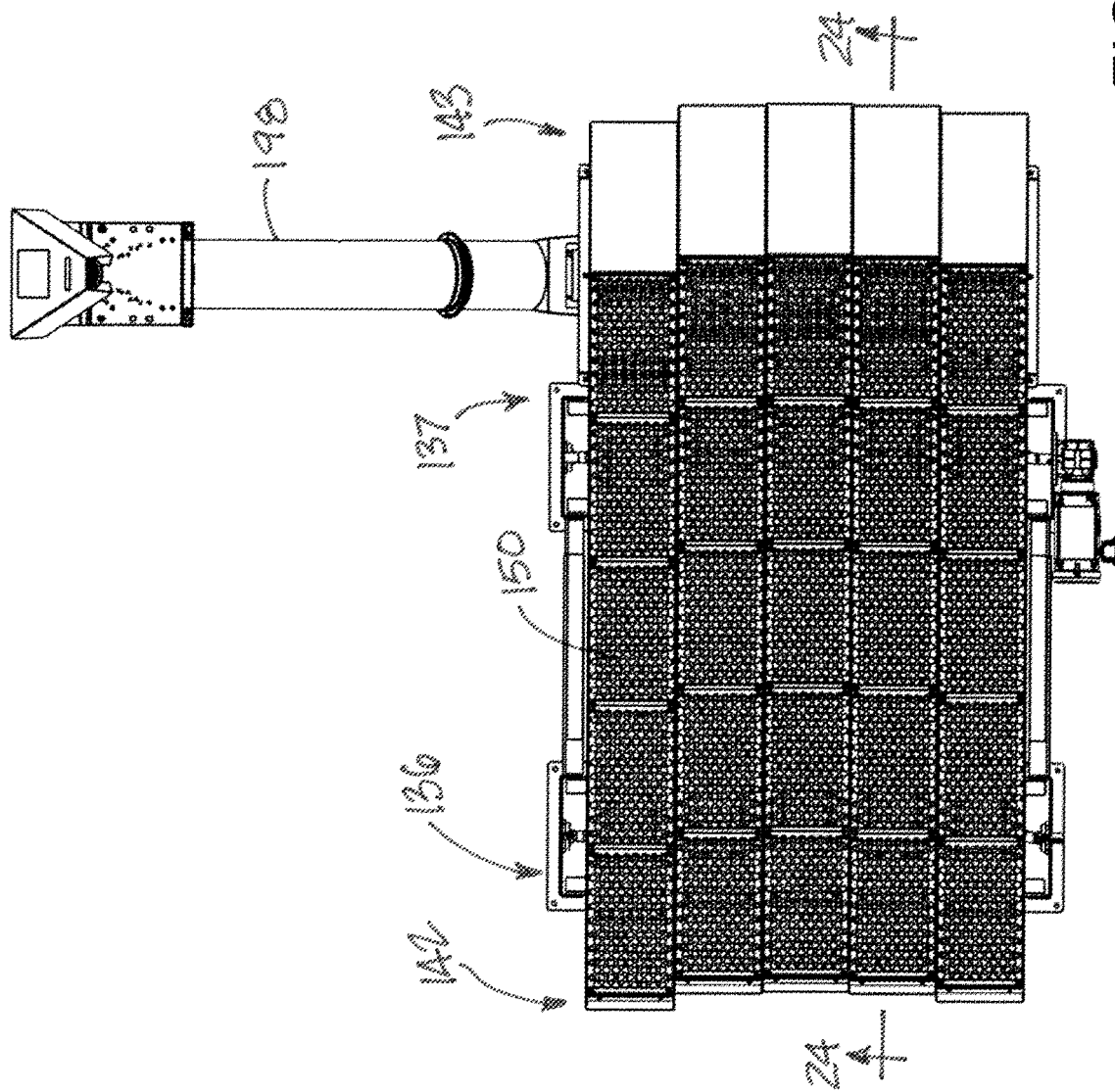
FIG. 23 is a schematic top perspective view of the illustrative separating apparatus shown in FIG. 12, according to an illustrative embodiment.
Figure 24:
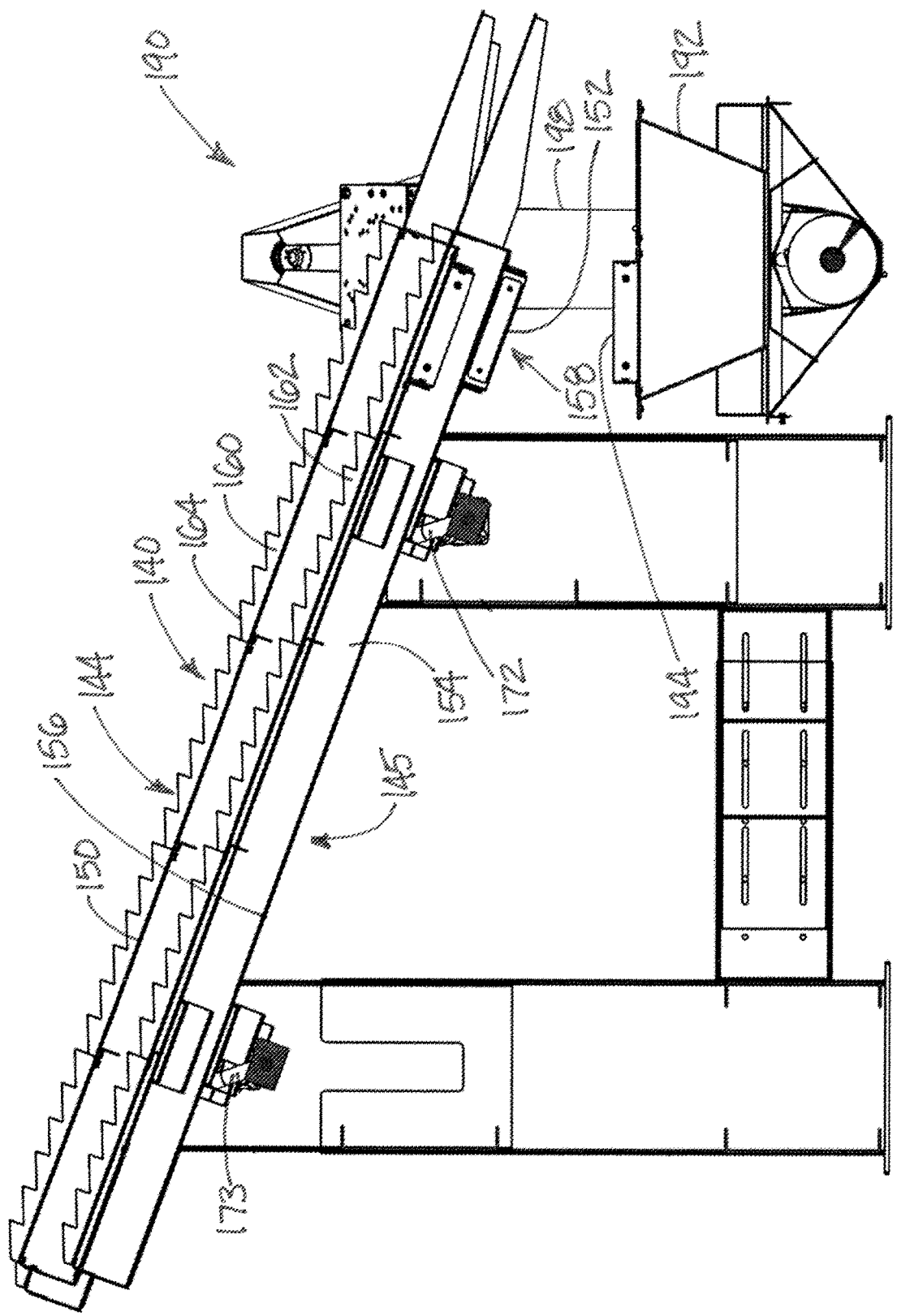
FIG. 24 is a schematic side sectional view of the illustrative separating apparatus shown in FIG. 22 taken along line 24-24 of FIG. 23, according to an illustrative embodiment.
Figure 25:
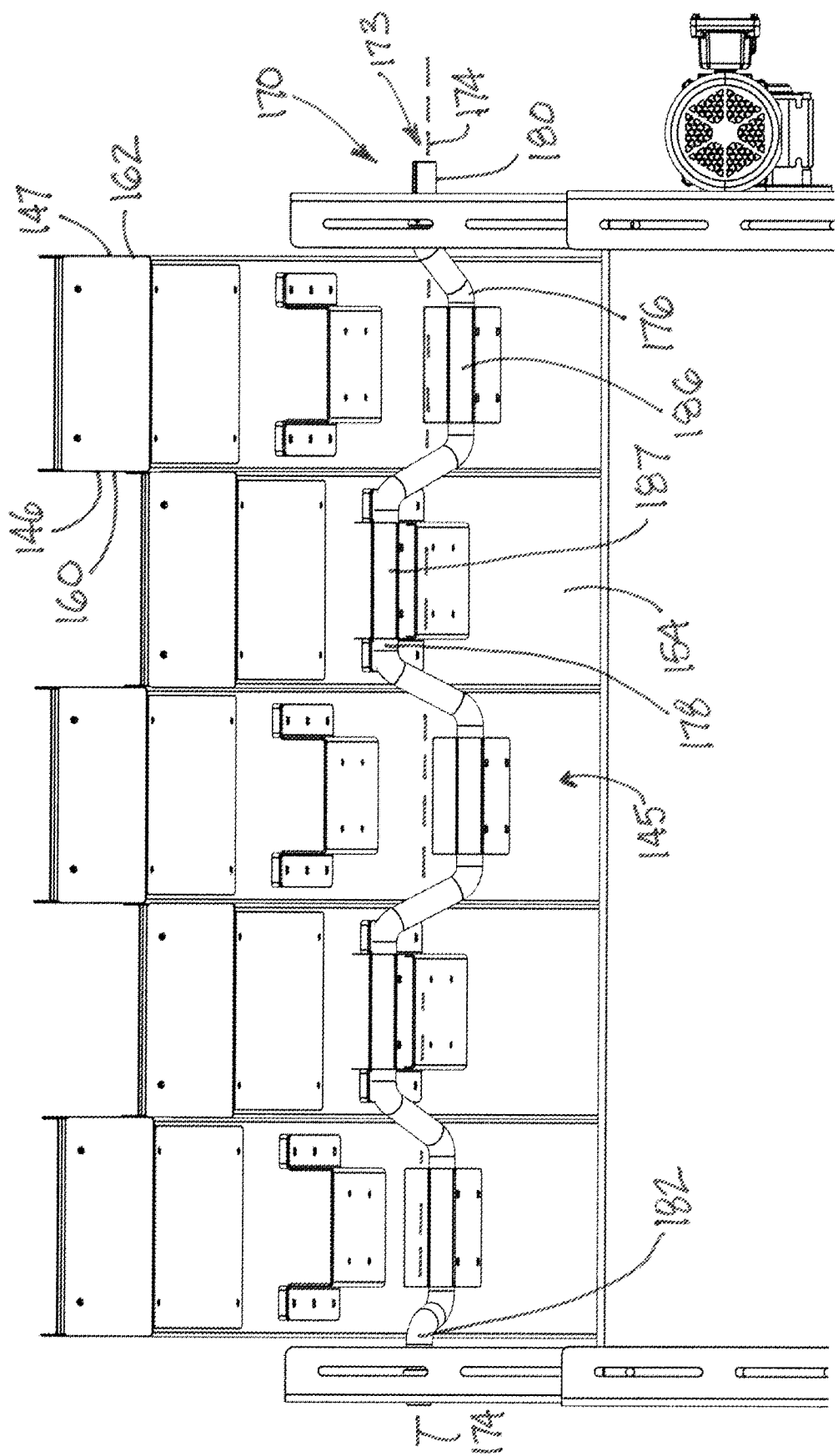
FIG. 25 is a schematic first end perspective view of the illustrative separating apparatus shown in FIG. 12, according to an illustrative embodiment.
Figure 26:
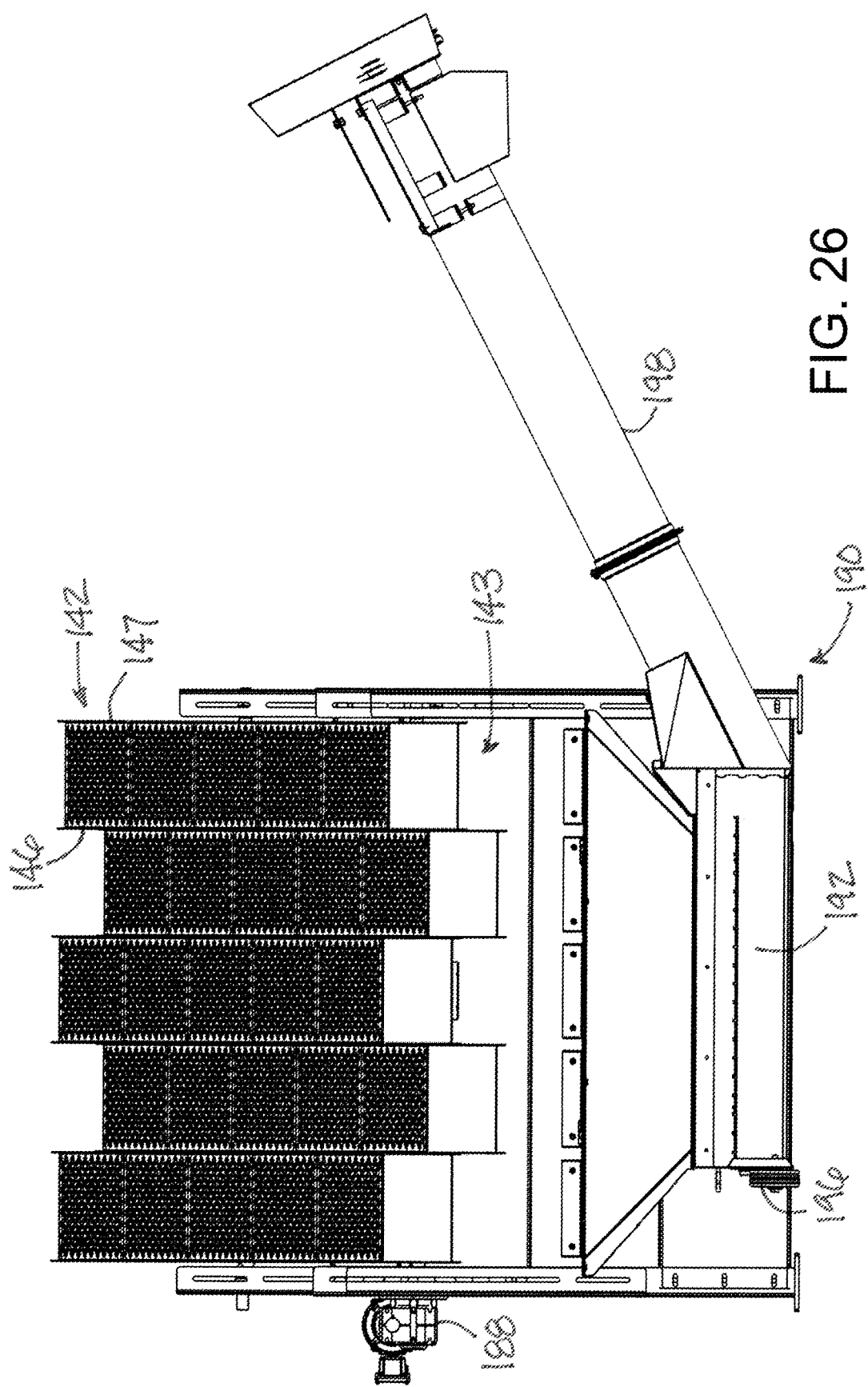
FIG. 26 is a schematic second end perspective view of the illustrative separating apparatus shown in FIG. 12, according to an illustrative embodiment.
Figure 27:
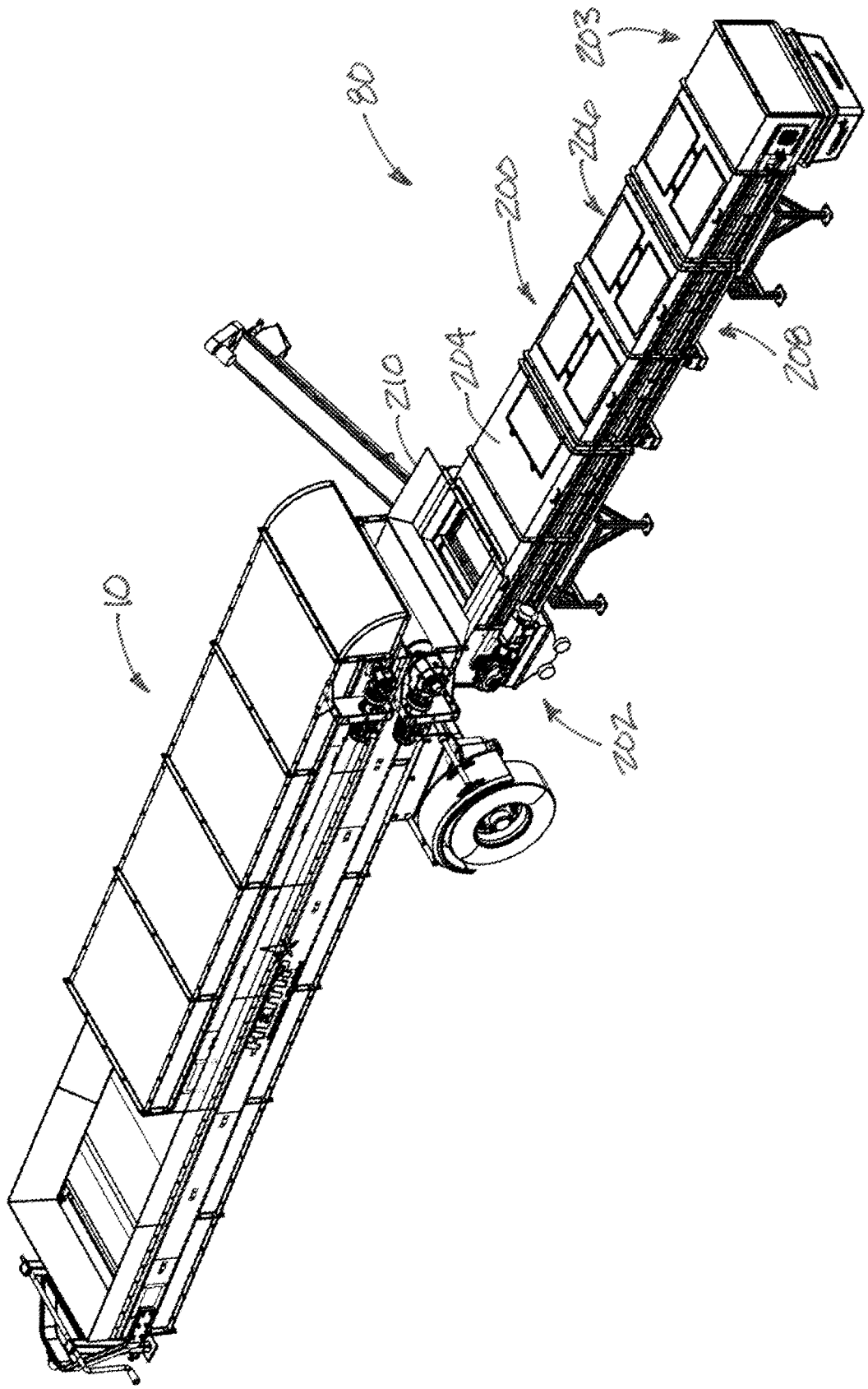
FIG. 27 is a schematic perspective view of the system, according to an illustrative embodiment.
Figure 28:
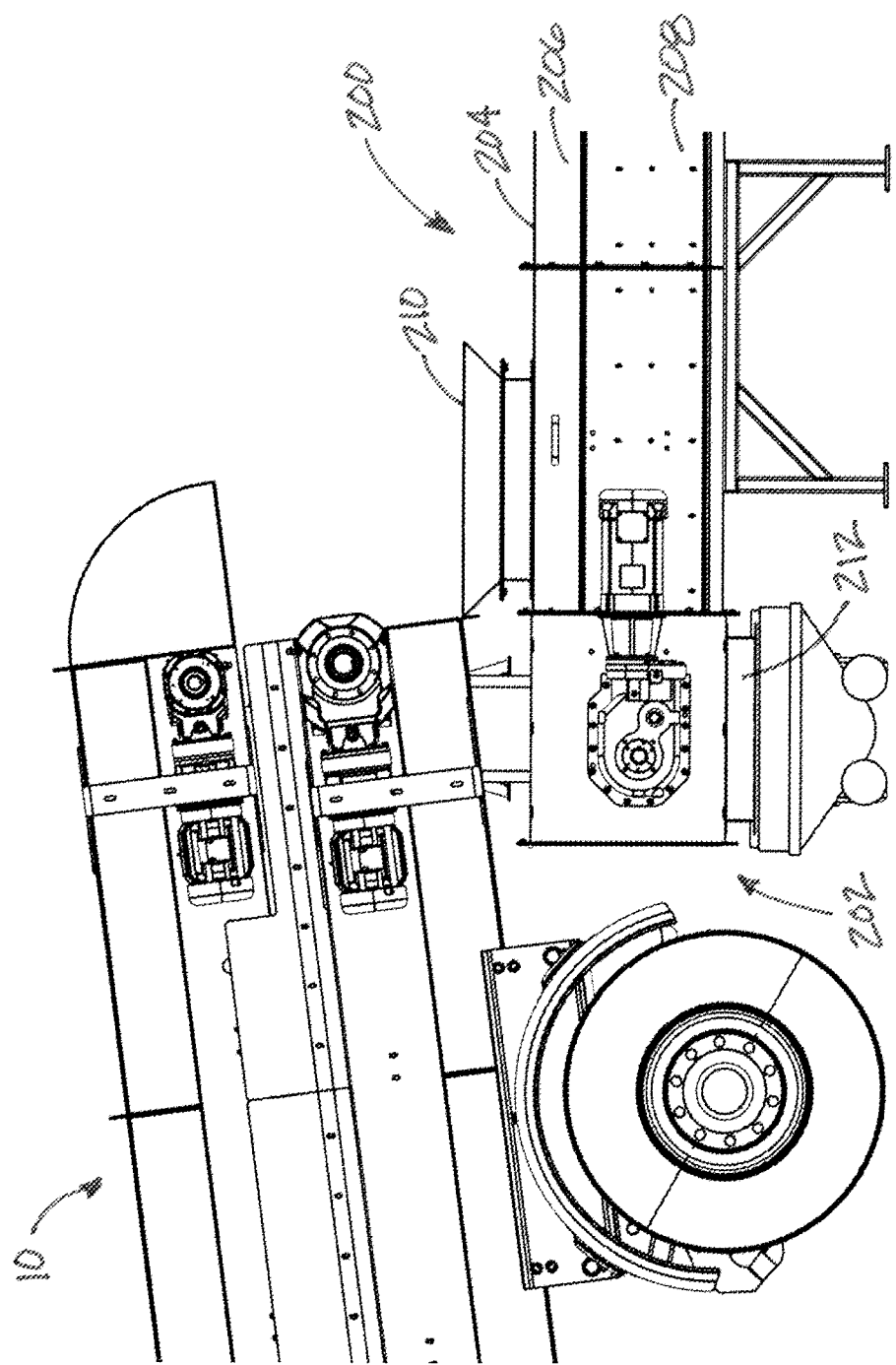
FIG. 28 is a schematic side view of portions of the stripping apparatus and separating apparatus of the system, according to an illustrative embodiment.
Figure 29:
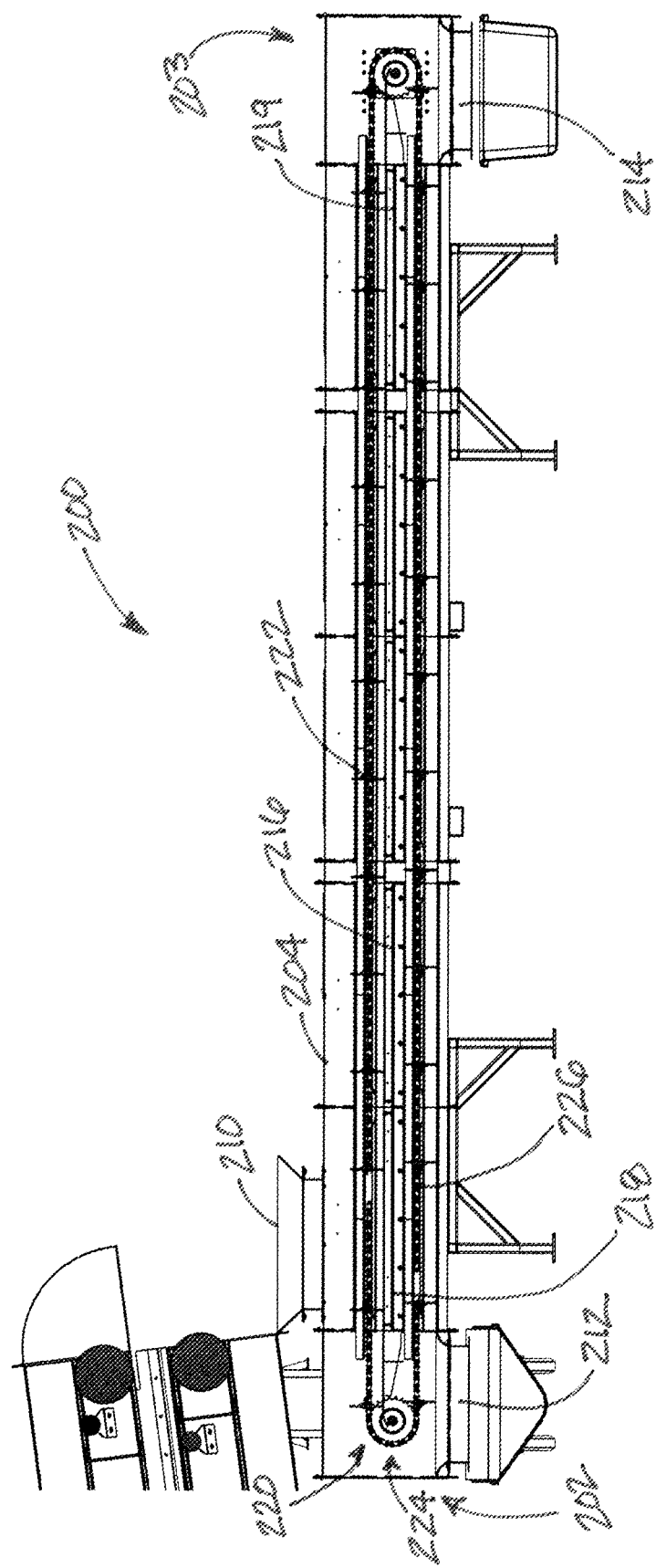
FIG. 29 is a schematic sectional view of the separating apparatus of the system, according to an illustrative embodiment.
Figure 30:
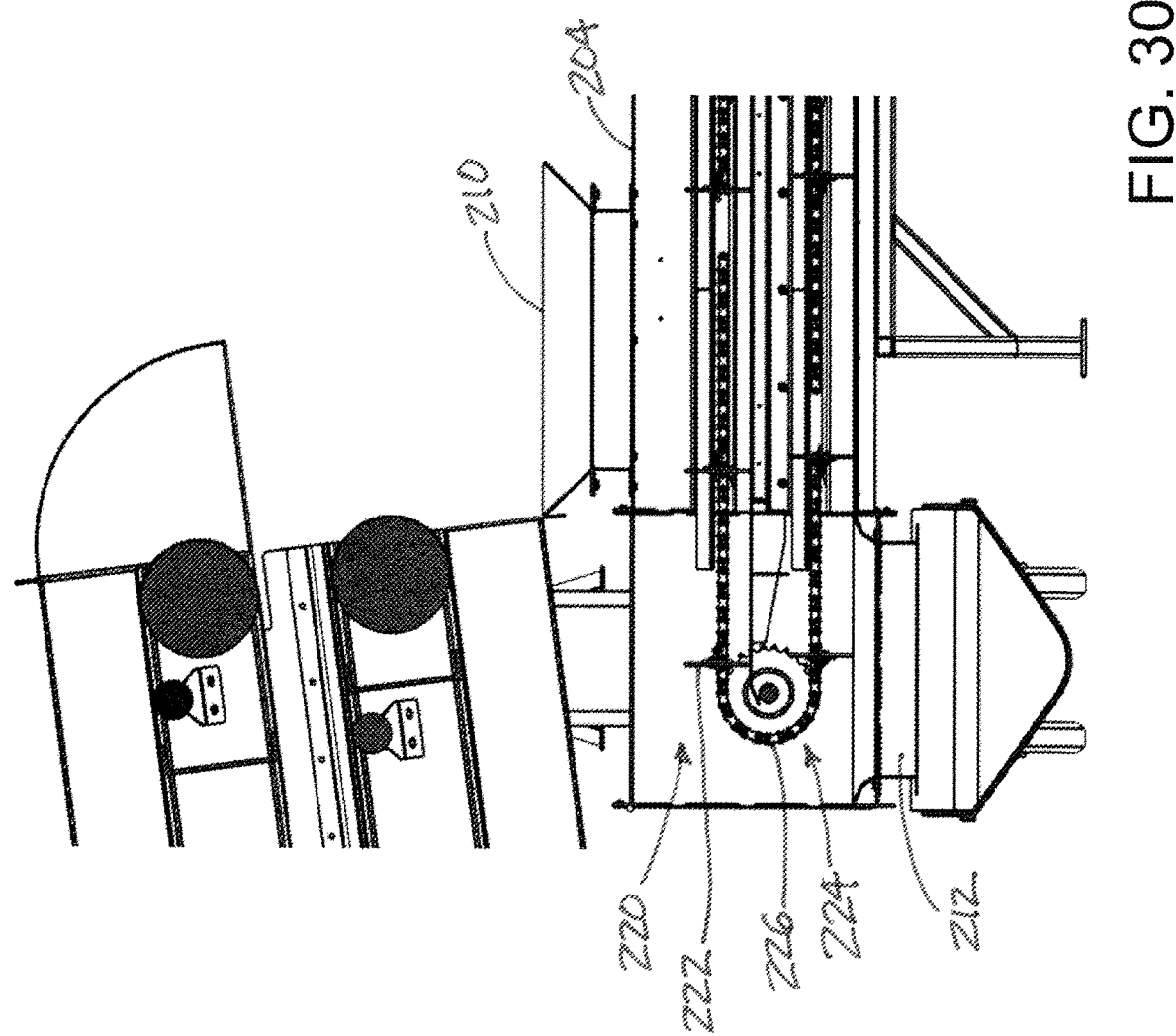
FIG. 30 is a schematic sectional view of a portion of the separating apparatus of the system, according to an illustrative embodiment.
Figure 31:
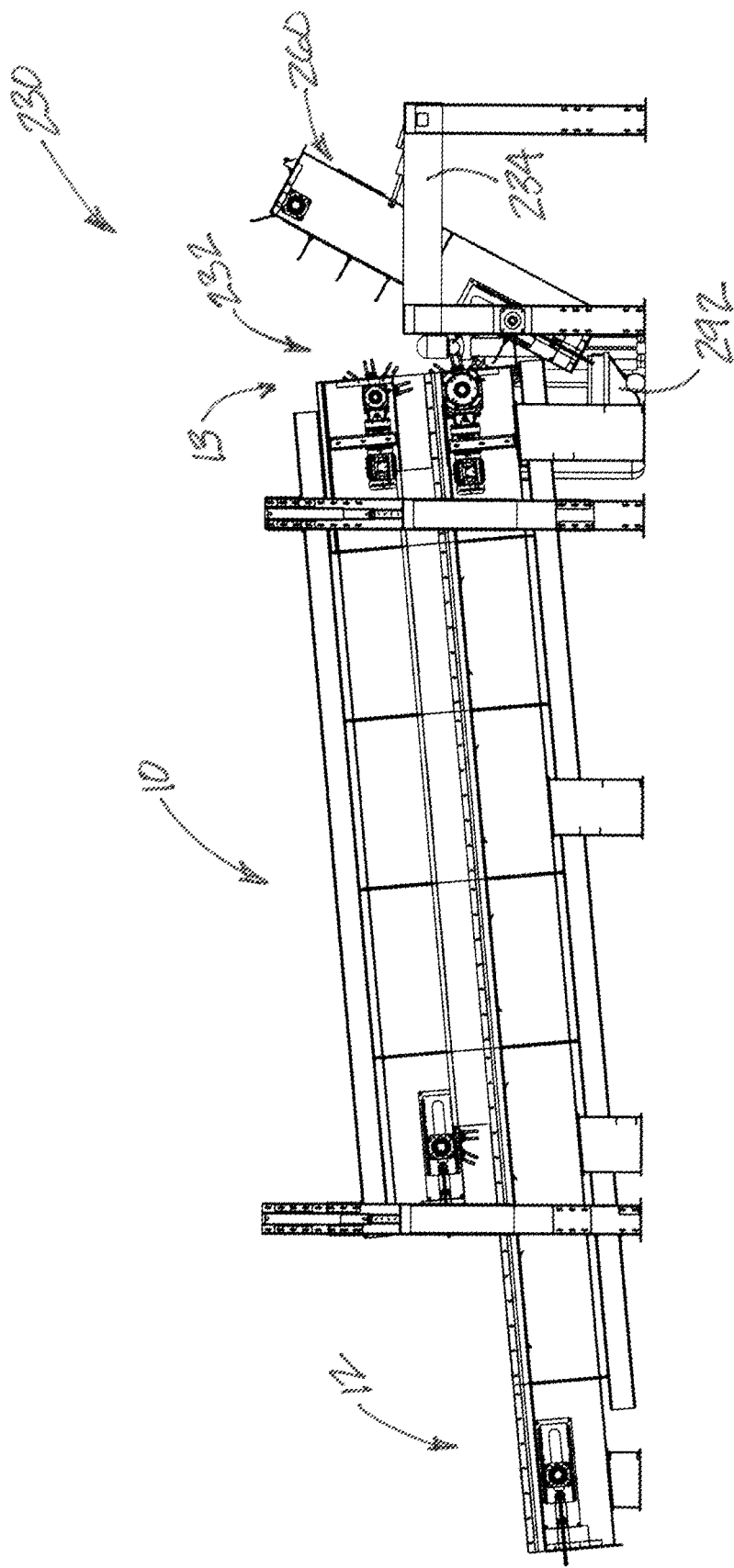
FIG. 31 is a schematic side view of a plant processing system utilizing another illustrative embodiment of a separating apparatus of the disclosure.
Figure 32:
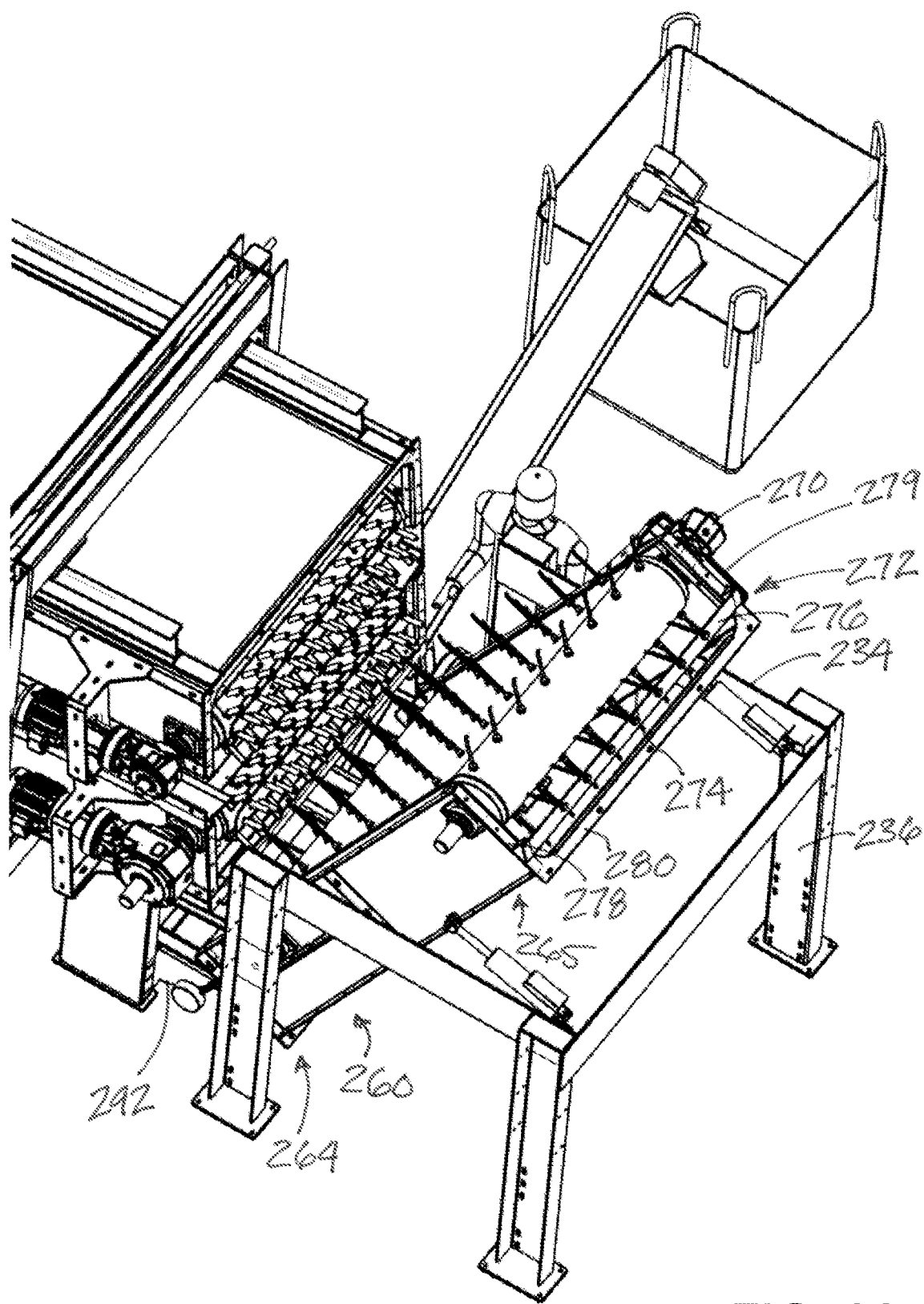
FIG. 32 is a schematic perspective view of the illustrative separating apparatus shown in FIG. 31, according to an illustrative embodiment.
Figure 33:
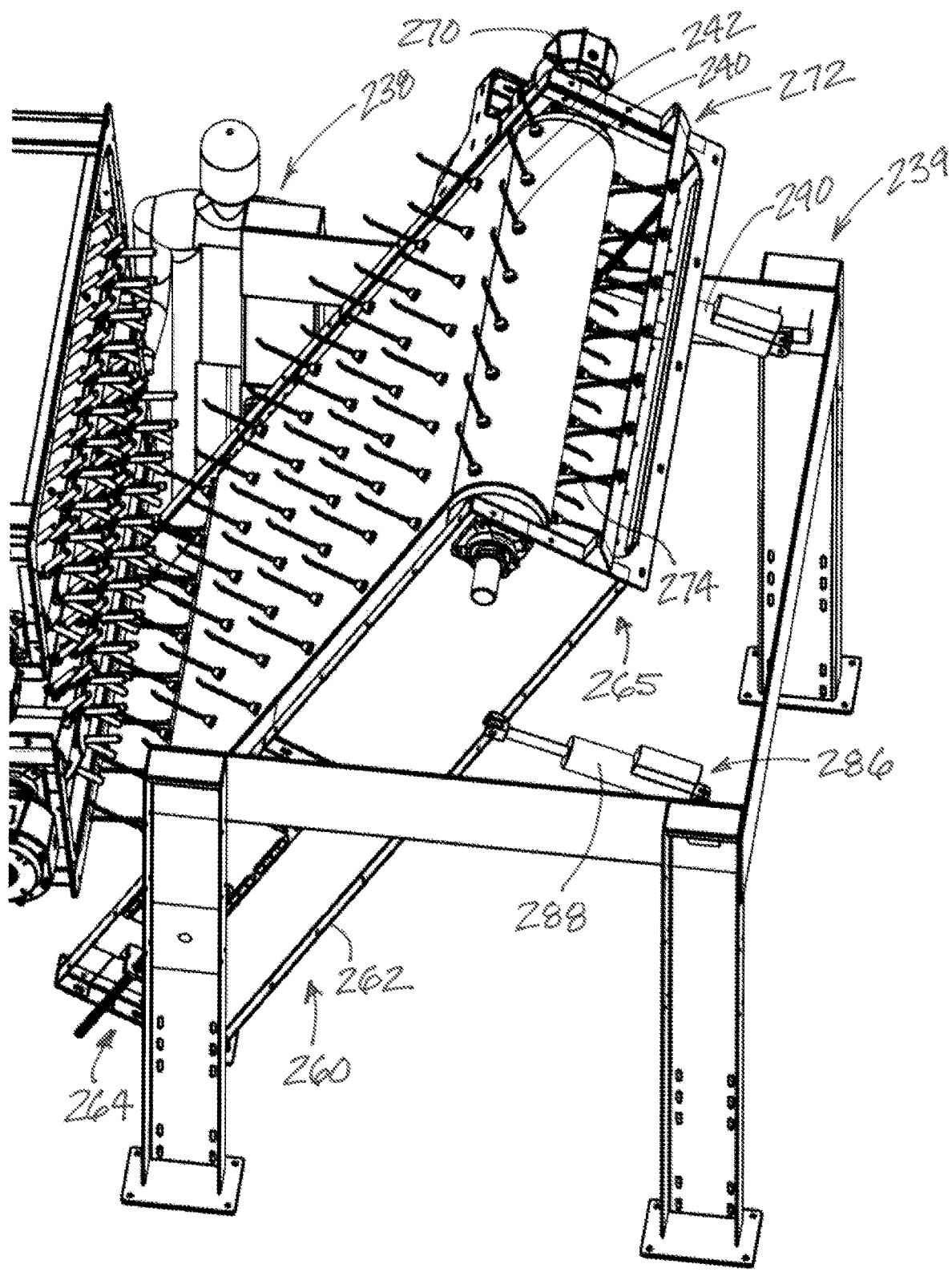
FIG. 33 is a schematic perspective view of the illustrative separating apparatus shown in FIG. 31, according to an illustrative embodiment.
Figure 34:
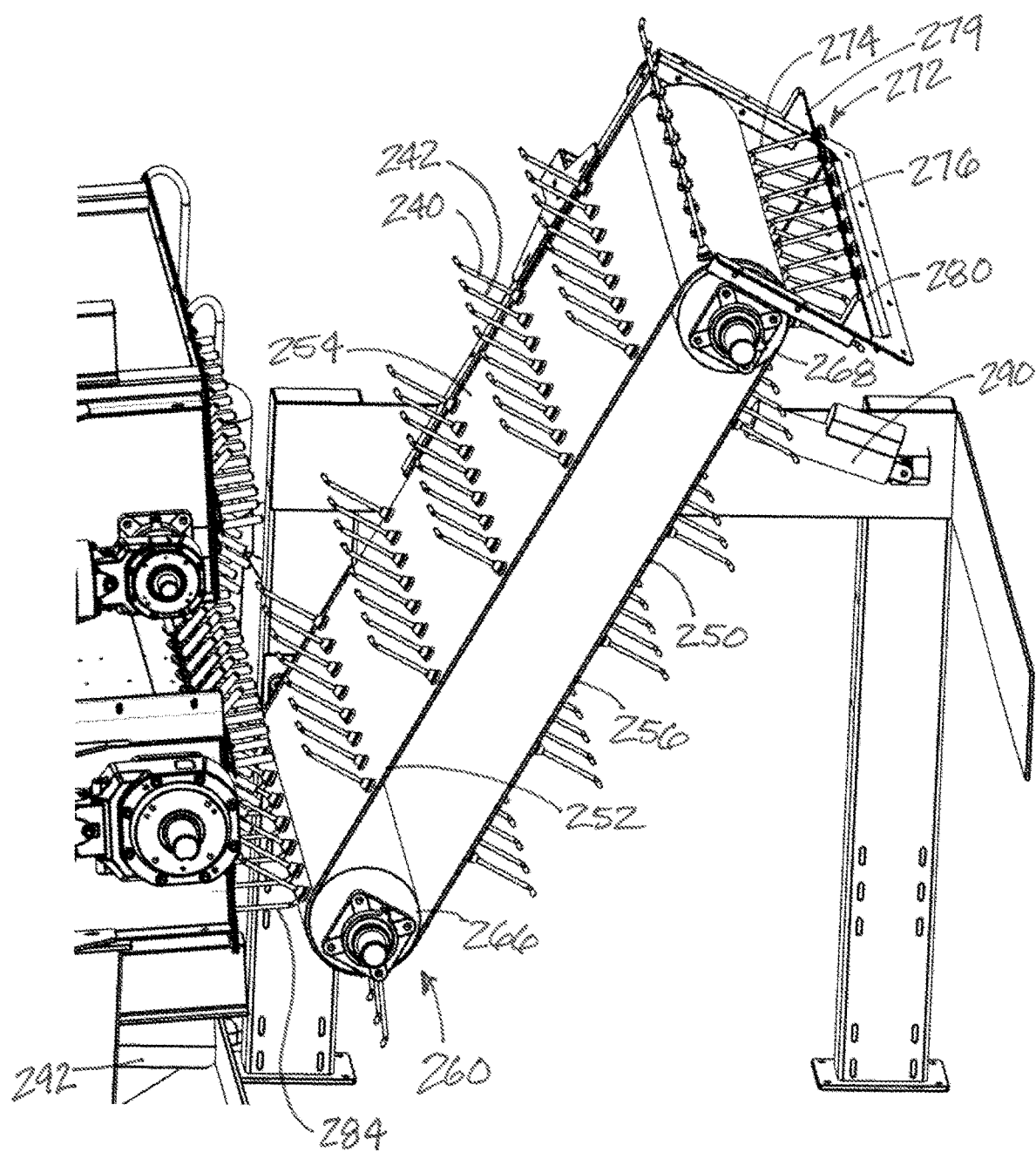
FIG. 34 is a schematic perspective view of the illustrative separating apparatus shown in FIG. 31 with parts removed to reveal detail of the belt and separating fingers, according to an illustrative embodiment.
Figure 35:
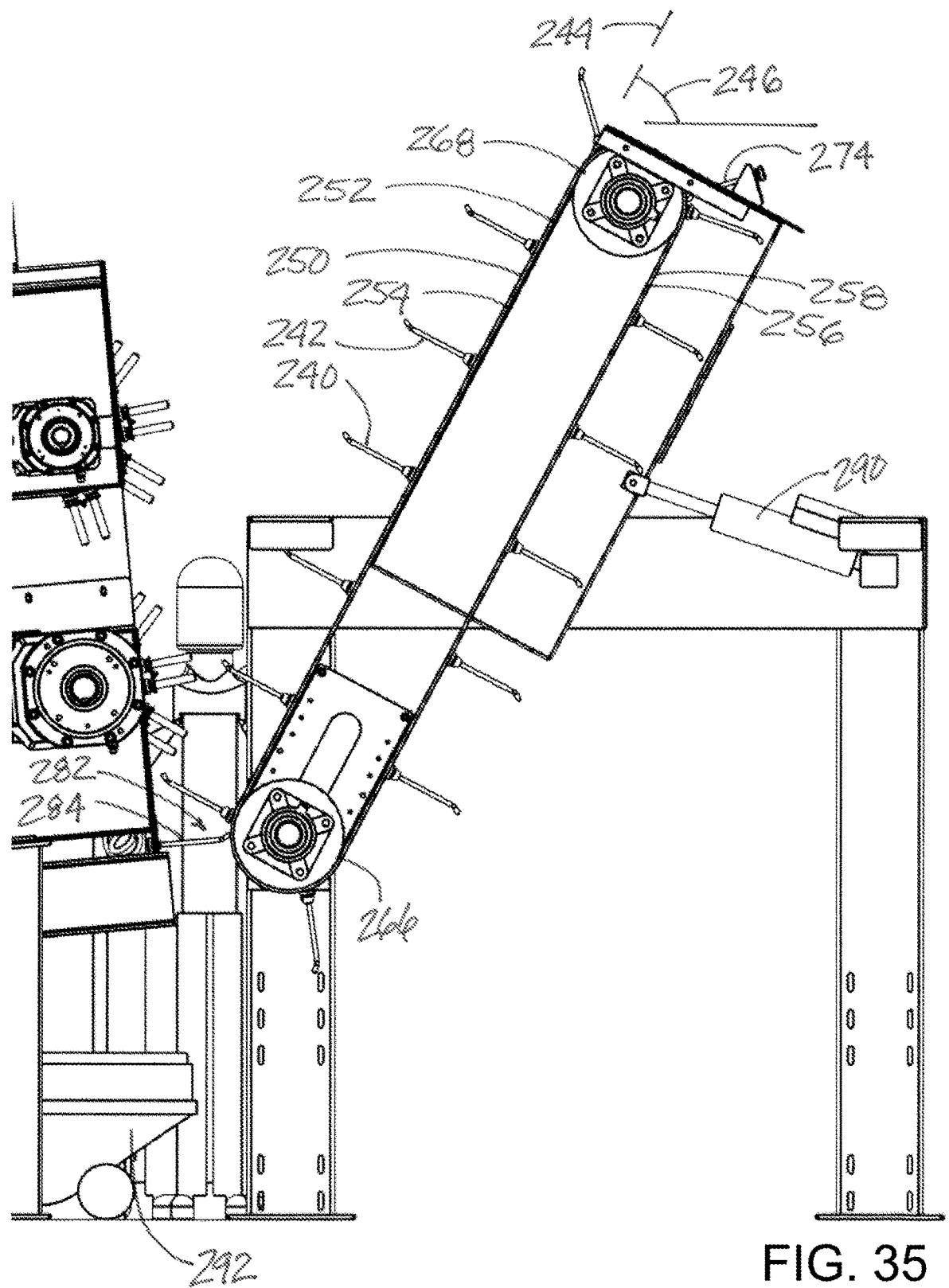
FIG. 35 is a schematic side view of the illustrative separating apparatus shown in FIG. 31 with parts removed to reveal detail of the belt and separating fingers, according to an illustrative embodiment.
Figure 36:
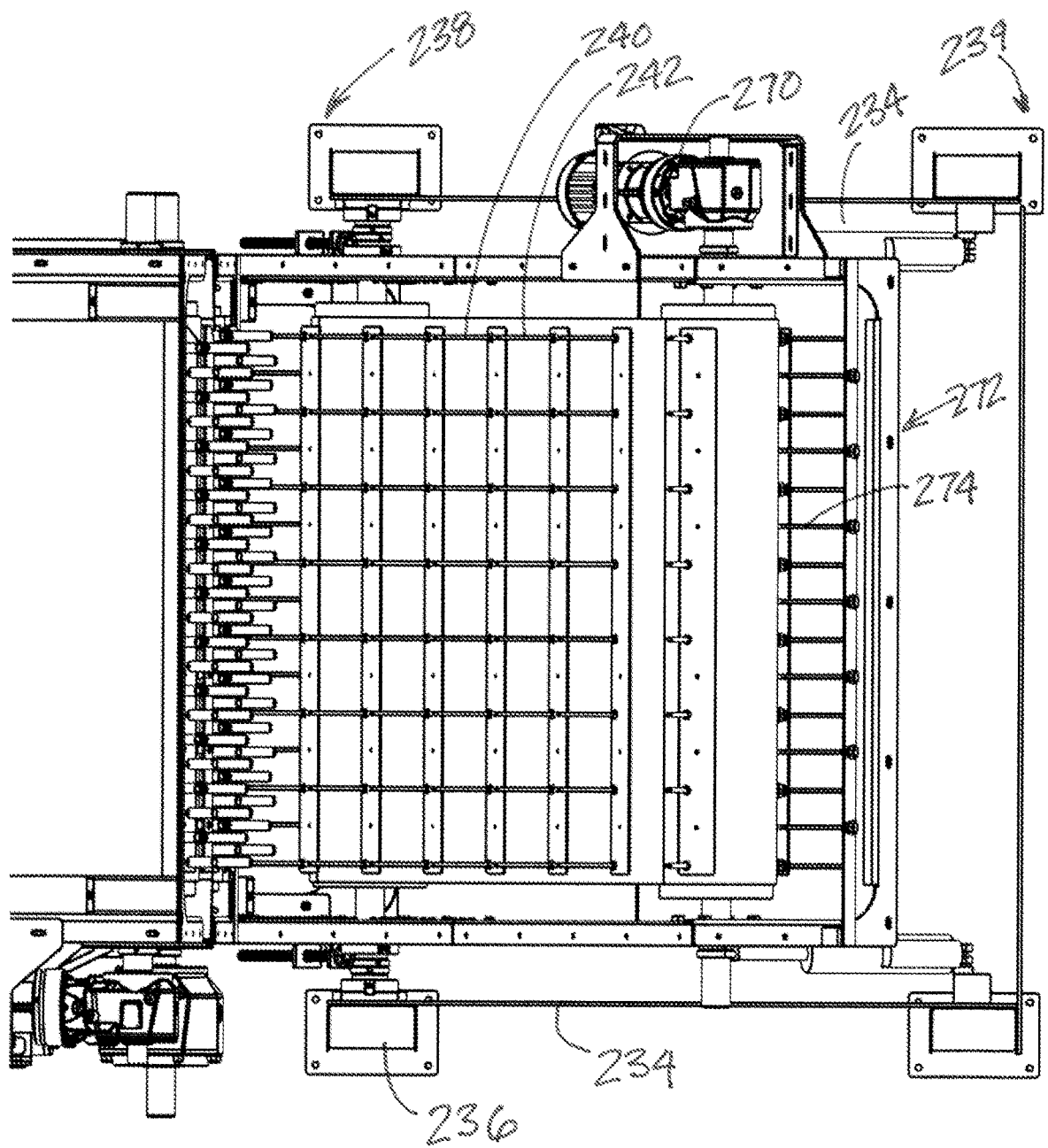
FIG. 36 is a schematic top view of the illustrative separating apparatus shown in FIG. 31, according to an illustrative embodiment.

In still other embodiments, such as is illustratively shown in FIGS. 19 through 21, a pair of rolls 120, 122 may each have a plurality of ridges 124 and a plurality of grooves 126 with the ridges and grooves being arranged alternately on each of the rolls. The rolls 120, 122 may be spaced from each other in a substantially parallel orientation to each other. The ridges 124 of each roll may protrude from each other to extend toward and into the grooves 126 of the other roll, and adjustment of the distance between the rotational axes of the rolls 120, 122 may also adjust the degree to which the ridges and grooves of the rolls intermesh. In some illustrative embodiments, the ridges 124 and the grooves 126 may have complementary helical shapes extending about the rotational axes of the rolls.

In another embodiment, such as is shown in FIGS. 22 through 26, a plant part separating apparatus 130 is provided that has features which separate smaller, more desirable particles of the plant materials from other larger, less desirable pieces of the plant material through agitation of the material and may also actively encourage movement of the plant material between ends of the separating apparatus. Illustratively, the separating apparatus 130 may comprise a frame 132 which may include a plurality of legs 134 which are restable on the ground surface. The frame 132 may have opposite ends 136, 137 with a first end 136 being positionable toward and generally adjacent to the plant stripping apparatus and a second end 137 which may be located generally opposite of the plant stripping apparatus. During operation, plant material may generally move from the first end 136 toward the second end 137.

The separating apparatus 130 may also include a plurality of separating devices 140 which are movable with respect to the frame 132. The separating devices 140 may be elongated in a longitudinal direction and may be positioned laterally adjacent to each other in a laterally extending array. Each of the separating devices 140 may have a proximal end 142 located toward the first end 136 of the frame, and a distal end 143 located toward the second end 137 of the frame. The separating devices 140 may be inclined downwardly toward the distal end 143 and may be inclined upwardly toward the proximal end 142. Each of the separating devices 140 may have a top 144 and a bottom 145 and opposite sides 146, 147. In some embodiments, each of the separating devices may be substantially tubular in configuration with an interior 148 that is at least partially hollow.

In some embodiments, each of the separating devices 140 may comprise an upper screen 150 having openings 152 to permit particles with a size at or below a predetermined size to fall through the screen 150 to reach the interior 148 of the respective separating device. As plant material moves over the separating devices 140, pieces of the plant material having sizes generally equal to or smaller than the size of the openings may fall through the upper screen 150 into the interior 148 of the respective separating device, while plant material pieces having sizes generally larger than the openings will remain above the upper screen on the top 144 of the devices 140. Each of the separating devices 140 may also include a lower tray 154 which is located below the upper screen 150 such that particles passing through the openings in the screen tend to land on an upper surface 156 of the lower tray. The lower tray 154 may have an outlet 158 located toward the distal end 143 of the separating device to permit particles on the upper surface 156 of the tray 154 to fall from the interior of the separating device. The separating devices 140 may also include sidewalls 160, 162 which extend from the lower tray 154 to the upper screen 150 to form the side boundaries of the interior 148 of the devices. One or both of the sidewalls 160, 162 may have upper edges 164 which may extend above the vertical level of the upper screen 150 such that the edges 164 protrude upwardly with respect to the upper screen. Illustratively, the upper edges 160 of the side walls may have a serrated shape which tends to advance movement of plant material resting upon the separating devices in a direction from the proximal end 142 toward the distal end 143 when the separating devices are actuated as described below.

The plant part separating apparatus 130 may also include an actuating assembly 170 mounting the separating devices 140 on the frame in a manner that may function to move the devices in a manner that may vibrate or agitate plant material passing across the devices, as well as advance the material in a direction from the first end 136 to the second end 137 of the frame Illustratively, the actuating assembly 170 may raise and lower the separating devices 140 with respect to the frame 132 as well as move the devices in a longitudinally which encourages movement of the plant material in a longitudinal direction. The actuating assembly 170 may move the separating devices 140 in a cyclical manner with respect to the frame, and may move adjacent separating devices in the lateral array in substantially opposite directions of each other.

In some embodiments, the actuating assembly 170 may include a crank 172 which has a crank axis 174 and an array of offset crank portions 176, 178 which are offset from the crank axis. The crank 172 may have end portions 180, 182 located on opposite ends of the crank which are positioned along the crank axis 174. Adjacent offset crank portions 176, 178 may be positioned on opposite sides of, or opposite offsets from, the crank axis 174. In some embodiments, a pair of the cranks 172, 173 may be utilized to support the separating devices at spaced locations on the separating devices as well as on the frame 132. The actuating assembly 170 may also include frame mounts 184 for mounting the crank 172 on the frame. Each frame mount 184 may be mounted on the frame and rotatably receive one of the end portions 180, 182 of the crank 172. The frame mounts 184 may thus mount the pair of cranks on the frame in a manner that allows the cranks to rotate with respect to the frame. The actuating assembly 170 may also include crank mounts 186, 187 which mount the separating devices 140 on the crank 172, with each crank mount being mounted on one of the separating devices and rotatably receiving one of the offset crank portions 176, 178. Further, a motor 188 may be operatively coupled to at least one of the cranks 172 to rotate the crank with respect to the frame and cause the offset crank portions to effectively orbit about the crank axis 174 and, via the crank mounts 186, 187, carry the separating devices in a cyclical rotational motion which may be out of phase with each other.

The plant part separating apparatus 130 may also include a collecting assembly 190 which is configured to collect particles captured by the separating devices 140. The collecting assembly 190 may be positioned toward the distal ends 143 of the separating devices, and may be located below the outlets 158 in the lower tray of each of the devices 140. The collecting assembly may also be located adjacent to the second end 137 of the frame. The collecting assembly 190 may include a hopper 192 which has an interior with an open top 194 positioned below the outlets 158 of the separating devices to collect particles falling from the separating devices under the influence of gravity. Wheels 196 may be mounted on the hopper 192 for resting on the ground surface to facilitate movement of the collecting assembly across a ground surface with respect to the frame. The collecting assembly 190 may also include an auger 198 which is mounted on the hopper 192 and may be configured to remove contents from the interior of the hopper such as the particles drawn away from the plant materials. The auger 198 may extend from the hopper and may extend outwardly and upwardly in an inclined fashion from the hopper. Bags or other containers may be positioned below the outlet of the auger to receive the particles for transport to other locations. Optionally, the particles may receive further processing relatively more local to the system.

In other embodiments, such as is illustratively shown in FIGS. 27 through 30, the plant part separating apparatus may comprise a scalper assembly 200 which is configured to separate constituent parts of the plant material from each other, such as separating the first plant parts from the second plant parts. The scalper assembly 200 may have a first end 202 and a second end 203. The scalper assembly 200 may be configured to move the first plant parts toward the first end 202 of the scalper assembly, and move the second plant parts toward the second end of the assembly 200.

The scalper assembly 200 may include a scalper housing 204 which is configured to receive plant material output by the plant stripping apparatus. The scalper housing 204 may have an upper portion 206 and a lower portion 208, and the upper portion may form a hood located above the lower portion. The scalper housing 204 may have an inlet 210 for receiving the plant material, such as from the plant stripping apparatus. The inlet 210 may be in communication with the plant stripping apparatus to receive plant material (typically including first and second plant parts) from the apparatus. The scalper housing 204 may have at least one outlet 212 for passing plant material out of the scalper assembly 200. A primary outlet 212 may be provided for passing first plant parts of the plant material out of the scalper assembly, and a secondary outlet 214 may be provided for passing second plant parts of the plant material out of the scalper assembly. In some embodiments, the primary outlet 212 may be positioned toward the first end 202 of the assembly 200, and the secondary outlet 214 may be positioned toward the second end 203 of the assembly 200.

The scalper assembly 200 may also include a scalper grate 216 which is configured to separate the first plant parts from second plant parts by, for example being configured to pass first plant parts through the grate while resisting second plant parts from passing through the grate. The scalper grate 216 may have an upper surface and a plurality of apertures extending through this upper surface of the grate. The apertures may be configured to permit the first plant parts resting on the surface of the grate 216 to pass through the apertures from the surface, while the apertures resist second plant parts resting on the surface of the grate from passing through the apertures. The scalper grate 260 may have a first end 218 located adjacent to the first end 202 of the assembly 200, and a second end 219 located adjacent to the second end 203 of the assembly 200. The first end 218 of the scalper grate may be positioned below the inlet of the scalper housing such that plant materials output by the plant stripping apparatus fall through the inlet and onto the surface of the scalper grate toward the first end 218 of the scalper grate. The primary outlet 212 may be positioned beneath the first end 218 of the grate, and the secondary outlet 214 may be positioned toward the second end 219 of the scalper grate such that the outlet 214 is positioned generally below the second end 219.

The scalper assembly 200 may also include a movement mechanism 220 which is configured to move plant material across the surface of the scalper grate 216. The movement mechanism may be configured to move plant material from the first end 218 of the scalper grate toward the second end 219. In some embodiments, the movement mechanism may comprise at least one brush 222 which is movable across the upper surface of the scalper grate 216 in a direction from the first end toward the second end of the grate 216. Optionally, a plurality of the brushes 222 may be utilized to move the plant material along the scalper grate. The movement mechanism may further include a carrier assembly 224 which carries the brush 222 or brushes across the grate 216. Illustratively, the carrier assembly 224 may include at least one chain loop 226 which extends over the grate, and may comprise a pair of chain loops which may extend substantially parallel to each other with a brush or brushes being attached to the chains such that the brushes extend between the chain loops. The brushes may be mounted on the chain loops at spaced locations along the length of the chamber forming the loop. While brushes 222 located on an upper extent of the chain loop 226 may tend to push plant material in a direction from the first end 202 toward the second end 203 of the scalper assembly, the brushes located on a lower extent of the chain loop may tend to push plant materials (such as second plant parts) which have passed through the scalper grate 216 along an upper surface of a bottom wall of the housing 204 toward the secondary outlet 214 to exit the interior of the housing.

In still other embodiments, such as is shown in FIGS. 31 through 36, an illustrative plant part separating apparatus 230 may have an intake 232 which is positionable adjacent to the output 13 of the plant stripping apparatus 10 such that the apparatus 230 is able to receive plant materials from the plant stripping apparatus. The separating apparatus 230 may include a main frame 234 which may include a plurality of legs 236 which are restable on the ground surface and may include additional cross members for structural reinforcement. The main frame 234 may have a first end 238 and a second end 239, with the first end 238 being located adjacent to the intake 232 of the separating apparatus 230 and being positionable adjacent to the output 13 of the plant stripping apparatus 10.

The separating apparatus 230 may also include a plurality of separating fingers 240, 242 which are movable with respect to the main frame 234 to engage plant materials received by the intake 232. The separating fingers 240, 242 may be positioned with respect to the intake 232 (and the output 13 of the stripping apparatus 10) such that plant materials may fall onto a portion of the plurality of separating fingers. The separating fingers may or may not have similar characteristics as the stripping fingers, as the separating fingers may generally function to carry materials in an upward direction without significant resistance other than the effect of gravity on the plant materials, and the separating fingers do not generally subject the plant materials to stripping forces. The separating fingers may also be somewhat longer than the stripping fingers since the separating fingers are not moving between opposing surfaces.

The portion of the plurality of separating fingers 240, 242 upon which the plant materials fall may generally move in an upward direction to carry plant materials in the upward direction. The separating fingers may move in a movement plane 244 which may be inclined such that the plane extends downwardly toward the first end 238 of the main frame and extends upwardly toward the second and 239 of the main frame. The movement plane 244 may be oriented at an angle 246 with respect to a horizontal plane, and the angle 246 may be adjustable. Suitable angle measurements of the angle 246 may be in the range of approximately 45 degrees to approximately 75 degrees, and in some embodiments the angle may have a measurement in the range of approximately 50 degrees to approximately 60 degrees. Illustratively, the angle 246 may be adjustable to a measurement of approximately 60 degrees with respect to the horizontal.

In illustrative embodiments, the plurality of separating fingers 240, 242 may be carried by a belt 250 which may be endless in character, and may exhibit some degree of flexibility. The belt 250 may be rotatably mounted on the main frame 234 and may have the separating fingers mounted thereon to move at least a portion of the separating fingers in the movement plane. The belt 250 may have an upper extent 252 with a generally upwardly facing surface 254 which is oriented substantially parallel to the movement plane. The belt 250 may also have a lower extent 256 with a generally downwardly facing surface 258. While in some of the most preferred embodiments, the belt 250 is formed of a sheet material which is substantially continuous between side edges in order to prevent plant materials from being able to move through the belt material, belts or supporting substrates formed of other materials and structures may be utilized.

The plurality of separating fingers 250 may be distributed over the surfaces of the extents of the belt, and may be substantially uniformly distributed over the extents of the belts. Significantly, the spacing between the separating fingers may be selected to facilitate the fingers engaging and holding some plant parts while permitting other plant parts to relatively easily pass between the fingers. For example, first plant parts may move easily between the fingers with little or no resistance from the fingers, while second plant parts pass tend to snag or get caught on the separating fingers. Generally, the first plant parts may be smaller and relatively compact, while the second plant parts may be larger and/or elongated. When the plant parts fall onto or otherwise engage the separating fingers on the upper extent 252 of the belt, the first plant parts will tend to move between the fingers and toward the lower end 264 of the frame 262 under the influence of gravity, as the fingers present relatively little resistance to this downward movement and even the movement of the upwardly facing surface 254 of the upper extent to the belt in the upward direction does not overcome the influence of gravity. In contrast, the second plant parts may tend to become ensnared in or otherwise caught between the separating fingers, and are consequently carried by the separating fingers upwardly toward the upper end 265 of the frame 262 against the influence of gravity as the first plant part move downwardly. The spacing between adjacent separating fingers may vary based upon the sizes of the plant parts, and the relative differential between the sizes of the plant parts. Illustratively, the spacing between adjacent separating fingers may range from approximately 1 inch to approximately 6 inches.

A belt supporting assembly 260 of the separating apparatus 230 may support the belt 250 on the main frame 234. The belt supporting assembly 260 may include an auxiliary frame 262 which is movably mounted on the main frame, and may be pivotally mounted on the main frame. The auxiliary frame 262 may have a lower end 264 and an upper end 265. The lower end of the auxiliary frame may be pivotally mounted on the main frame 234 such that the upper end 265 of the auxiliary frame is able to be moved substantially in an arc with respect to the main frame when with the orientation of the belt is adjusted. The belt supporting assembly 260 may also include a pair of support pulleys 266, 268 which are rotatably mounted on the auxiliary frame 262 at spaced locations on the frame 262. A first support pulley 266 may be mounted at the lower end 264 of the auxiliary frame and a second support pulley 268 may be mounted at the upper end 265 of the frame 262. A motor 270 may be configured to rotate at least one of the support pulleys 266, 268 to affect movement of the belt 250. The motor 270 may be configured to rotate the belt such that the upper extent 252 of the belt moves in an upward direction toward the upper end 264 of the frame 262 and toward the second support pulley, and the lower extent 256 of the belt moves in a downward direction toward the lower end 264 of the frame and toward the first support pulley. The motor 270 may be mounted on the auxiliary frame 262 and may be connected to the second support pulley 268.

The separating apparatus 230 may also include a dislodging assembly 272 which is configured to dislodge plant materials from the separating fingers 240, 242. The dislodging assembly 272 may be mounted on the auxiliary frame 262 to move with the frame 262, and may be located toward the upper end 265 of the frame 262. In greater detail, the dislodging assembly 272 may include a plurality of dislodging fingers 274 which extend into spaces between the separating fingers 240, 242 to engage plant material carried by the separating fingers. The dislodging fingers 274 may be stationary with respect to the moving separating fingers, and may be mounted on the auxiliary frame 262. The dislodging fingers may be relatively rigid to facilitate the fingers dislodging plant materials from the separating fingers.

To support the dislodging fingers in a suitable relationship to the separating fingers, a support member 276 may be provided. The support member 276 may be mounted on the auxiliary frame 262 and may be spaced from the belt so that the moving separating fingers pass between the belt and the support member 276. The dislodging figures 276 may be mounted on the support member and extend toward the belt. Illustratively, the support member 276 may have side portions 278, 279 which are mounted to the auxiliary frame 262 and may also have a transverse portion 280 which extends between the side portions and is also mounted on the side portions. The dislodging fingers 274 may be mounted on the transverse portion 280 of the support member.

The apparatus 230 may also include a catching assembly 282 which is configured to catch plant materials falling between the output 13 of the plant stripping apparatus and the intake 232 of the separating apparatus 230. The catching assembly 282 may be positioned adjacent to the lower end 264 of the auxiliary frame and may be positioned adjacent to the surface of the belt. The catching assembly 282 may include a plurality of catching fingers 284 which extend into the spaces between the separating fingers 240, 242. The catching fingers 284 may be stationary with respect to the moving separating fingers. The catching fingers may be relatively rigid to support plant materials until the materials are engaged and moved by the separating fingers. The catching fingers 284 may be mounted on the auxiliary frame 262 and may extend between the plant stripping apparatus 10 and the plant part separating apparatus 230.

The separating apparatus 230 may also include an adjustment assembly 286 which is configured to adjust the orientation of the belt 250 with respect to the main frame 234 to change the movement plane of the separating fingers, which may adjust and fine tune the ability of the separating fingers to retain the second plant materials while releasing the first plant parts. The adjustment assembly 286 may be configured to at least partially rotate the orientation of the belt with respect to the main frame to change the angle of the movement plane 244. The adjustment assembly 286 may extend between the main frame 234 and the auxiliary frame 262 of the belt supporting assembly. Illustratively, the adjustment assembly 286 may comprise at least one actuator 288 which is mounted on the main frame and mounted on the auxiliary frame. The actuator 288 may be extendable and retractable to adjust the orientation of the auxiliary frame with respect to the main frame. Illustratively, extension of the actuator 288 may increase the angle measure of the movement plane and retraction of the actuator may decrease the angle measure of the movement plane. In some implementations, a pair of the actuators 288, 290 may be utilized between the main frame and the auxiliary frame.

The apparatus 230 may further include a collecting hopper 292 may be positioned below the lower end 264 of the auxiliary frame 262 to catch plant parts (such as first plant parts) falling from the upper extent 252 and to transport the plant parts to a point for further processing, such as via an auger, to an elevated position above a collection bag.

In operation, plant materials leaving the output 13 of the plant stripping apparatus 10 tend to fall downwardly from the output toward the input of the separating apparatus 230, and either fall upon the separating fingers and the upwardly facing surface 254 of the upper extent 252 of the belt 250, or fall onto the catching fingers 284 of the catching assembly 282. Plant materials falling upon the separating fingers are moved upwardly by the movement of the upper extent of the belt 250, and those plant materials falling upon the catching fingers may be engaged by separating fingers as the separating fingers are moved through and past the spaced catching fingers as a result of the rotation of the belt. The relatively smaller plant materials, such as the first plant parts, may continue to travel down the belt, moving between the separating fingers, and to the collecting hopper. The relatively larger plant materials, such as the second plant parts, may be carried upwardly by the separating fingers toward the upper end 265 of the auxiliary frame, and upon reaching the upper end may be engaged by the dislodging fingers 274 of the dislodging assembly which tend to disengage the plant materials from the separating fingers to allow the plant materials to fall downwardly under the influence of gravity to a location different from the smaller plant materials in the collecting hopper.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A plant processing system for processing plant material having at least two types of constituent parts attached together, the system comprising:
a plant stripping apparatus configured to detach the constituent parts of the plant material from each other, the plant stripping apparatus having an input and an output, the plant stripping apparatus being elongated in a longitudinal direction and having a lateral direction oriented substantially perpendicular to the longitudinal direction, the plant stripping apparatus comprising:
a frame;
a plurality of stripping fingers comprising at least two groups of the stripping fingers including a first said group of stripping fingers and a second said group of stripping fingers, at least one group of said stripping fingers being movable with respect to the frame along a path of movement, the first group of fingers extending from a first working surface and the second group of fingers extend from a second working surface, the first working surface being oriented in substantial opposition to the second working surface, a gap being formed between the first and second working surfaces, the gap having a uniform width between the first and second working surfaces between the input and the output of the plant stripping apparatus to form a pathway for movement of plant materials between the input and output of the stripping apparatus;
wherein the stripping fingers of the first group on the first working surface and the stripping fingers of the second group on the second working surface extend from the respective working surfaces into the gap in substantially parallel orientations to each other;
wherein each of the stripping fingers has a tip, the tips of the stripping fingers of the first group each being positioned in a first plane, the tips of the stripping fingers of the second group each being positioned in a second plane, the first and second planes being parallel to each other;
wherein each group of the stripping fingers includes a plurality of rows of the stripping fingers, the stripping fingers of at least one row of the plurality of rows being arranged in a linear alignment extending in the lateral direction, the stripping fingers of the at least one row being laterally spaced from adjacent stripping fingers in the linear alignment to form a plurality of laterally extending spaces located between the adjacent stripping fingers in the row; and
wherein the stripping fingers of a subgroup of the first group of fingers extend along a first longitudinal line and the fingers of a subgroup of the second group of fingers extend along a second longitudinal line, the first longitudinal line being laterally offset with respect to the second longitudinal line such that fingers of the subgroup of the first group of fingers move longitudinally through the laterally extending spaces between the stripping fingers of the subgroup of the second group of fingers substantially without contact between the fingers of the first and second groups.

2. The system of claim 1 wherein the plant stripping apparatus additionally comprises at least one belt on which at least one of said groups of stripping fingers is mounted, the at least one belt having a first surface, a portion of the first surface forming the first working surface from which the first group of fingers extends.

3. The system of claim 2 wherein the plurality of stripping fingers on the at least one belt are formed by a plurality of cleats extending from the first surface of the at least one belt, each of the cleats being formed by a wall extending between opposite lateral side edges of the at least one belt, a plurality of notches being formed in the wall of the cleat to define the stripping fingers.

4. The system of claim 3 wherein the wall of each of the cleats has a base at the first surface of the belt and a tip edge opposite of the base, the notches in the wall of the cleat extending from the tip edge toward the base.

5. The system of claim 1 wherein the plant stripping apparatus comprises a first roll rotatably mounted on the frame and a second roll rotatably mounted on the frame, the first roll having the first group of fingers extending therefrom and the second roll having the second group of fingers extending therefrom, fingers of the first group in fingers of the second group extending into a gap between the rolls to contact plant material passing therebetween.

6. The system of claim 1 additionally comprising a plant part separating apparatus receiving plant material from the output of the plant stripping apparatus and being configured to separate first plant parts of the constituent parts of the plant material from second plant parts of the constituent parts of the plant material.

7. A plant processing system for processing plant material having at least two types of constituent parts attached together, the system comprising:
- a plant stripping apparatus configured to detach the constituent parts of the plant material from each other, the plant stripping apparatus having an input and an output, the plant stripping apparatus being elongated in a longitudinal direction and having a lateral direction oriented substantially perpendicular to the longitudinal direction, the plant stripping apparatus comprising:
    - a frame;
    - a plurality of stripping fingers comprising at least two groups of the stripping fingers including a first said group of stripping fingers and a second said group of stripping fingers, at least one group of said stripping fingers being movable with respect to the frame along a path of movement, the first group of fingers extending from a first working surface and the second group of fingers extend from a second working surface, the first working surface being oriented in substantial opposition to the second working surface, a gap being formed between the first and second working surfaces, the gap providing a pathway for movement of plant materials between the input and output of the stripping apparatus; and
- a plant part separating apparatus receiving plant material from the output of the plant stripping apparatus and being configured to separate first plant parts of the constituent parts of the plant material from second plant parts of the constituent parts of the plant material;
- wherein the plant part separating apparatus comprises:
    - a frame having opposite first and second ends with the first end being positioned adjacent to the plant stripping apparatus;
    - a plurality of separating devices elongated between the first and second ends of the frame and being positioned laterally-adjacent to each other in a lateral array, the separating devices being movable with respect to the frame, the separating devices being inclined downwardly toward the second end of the frame and being inclined upwardly toward the first end of the frame; and
    - an actuating assembly mounting the separating devices on the frame and being configured to raise and lower the separating devices with respect to the frame in a cyclical manner moving adjacent separating devices in substantially opposite directions.

8. The system of claim 7 wherein the plant part separating apparatus further comprises a collecting assembly configured to collect particles captured by the separating devices.

9. The system of claim 7 wherein each of the separating devices has an upper screen with openings to permit particles with a size at or below a predetermined size to fall through the screen to reach an interior of the respective separating device.

10. The system of claim 8 wherein each of the separating devices has a lower tray positioned below the upper screen such that particles passing through the openings of the screen tend to land on the lower tray, the lower tray having an outlet toward the second end of the separating device to permit particles on the upper surface of the lower tray to fall from the interior of the separating device.

11. The system of claim 6 wherein the plant part separating apparatus comprises a scalper assembly configured to separate constituent parts of the plant material, the scalper assembly being configured to separate the first plant parts of the constituent parts from the second plant parts of the constituent parts.

12. The system of claim 6 wherein the plant part separating apparatus has an intake positionable adjacent to the output of the plant stripping apparatus, the plant part separating apparatus including:
- a main frame; and
- a plurality of separating fingers movable with respect to the frame to engage plant materials received by the intake, the separating fingers being positioned with respect to the intake such that plant materials fall onto a portion of the plurality of separating fingers.

13. A plant processing system for processing plant material having at least two types of constituent parts attached together, the system comprising:
- a plant stripping apparatus configured to detach the constituent parts of the plant material from each other, the plant stripping apparatus having an input and an output, the plant stripping apparatus being elongated in a longitudinal direction and having a lateral direction oriented substantially perpendicular to the longitudinal direction, the plant stripping apparatus comprising:
    - a frame;
    - a plurality of stripping fingers comprising at least two groups of the stripping fingers including a first said group of stripping fingers and a second said group of stripping fingers, at least one group of said stripping fingers being movable with respect to the frame along a path of movement, the first group of fingers extending from a first working surface and the second group of fingers extend from a second working surface, the first working surface being oriented in substantial opposition to the second working surface, a gap being formed between the first and second working surfaces, the gap providing a pathway for movement of plant materials between the input and output of the stripping apparatus; and
- a plant part separating apparatus receiving plant material from the output of the plant stripping apparatus and being configured to separate first plant parts of the constituent parts of the plant material from second plant parts of the constituent parts of the plant material;
- wherein the plant part separating apparatus has an intake positionable adjacent to the output of the plant stripping apparatus, the plant part separating apparatus including:
    - a main frame; and
    - a plurality of separating fingers movable with respect to the frame to engage plant materials received by the intake, the separating fingers being positioned with respect to the intake such that plant materials fall onto a portion of the plurality of separating fingers;

wherein the portion of the plurality of separating fingers are movable in a movement plane, the movement plane being inclined with respect to a horizontal plane such that the movement plane is inclined downwardly toward the intake and inclined upwardly away from the intake.

14. A plant processing system for processing plant material having at least two types of constituent parts attached together, the system comprising:
a plant stripping apparatus configured to detach the constituent parts of the plant material from each other, the plant stripping apparatus having an input and an output, the plant stripping apparatus being elongated in a longitudinal direction and having a lateral direction oriented substantially perpendicular to the longitudinal direction, the plant stripping apparatus comprising:
a frame;
a plurality of stripping fingers comprising at least two groups of the stripping fingers including a first said group of stripping fingers and a second said group of stripping fingers, at least one group of said stripping fingers being movable with respect to the frame along a path of movement, the first group of fingers extending from a first working surface and the second group of fingers extend from a second working surface, the first working surface being oriented in substantial opposition to the second working surface, a gap being formed between the first and second working surfaces, the gap providing a pathway for movement of plant materials between the input and output of the stripping apparatus; and
a plant part separating apparatus receiving plant material from the output of the plant stripping apparatus and being configured to separate first plant parts of the constituent parts of the plant material from second plant parts of the constituent parts of the plant material;
wherein the plant part separating apparatus has an intake positionable adjacent to the output of the plant stripping apparatus, the plant part separating apparatus including:
a main frame; and
a plurality of separating fingers movable with respect to the frame to engage plant materials received by the intake, the separating fingers being positioned with respect to the intake such that plant materials fall onto a portion of the plurality of separating fingers;
a belt rotatably mounted on the main frame and having the plurality of separating fingers mounted thereon, the belt having an upper extent with a substantially upwardly facing surface and a lower extent with a substantially downwardly facing surface.

15. The system of claim 14 additionally comprising a belt supporting assembly supporting the belt on the main frame, the belt supporting assembly including:
an auxiliary frame mounted on the main frame and having a lower end toward the intake and an upper end away from the intake; and
a pair of support pulleys rotatably mounted on the auxiliary frame at spaced locations on the auxiliary frame, a first one of the support pulleys being mounted at the lower end of the auxiliary frame and a second one of the support pulleys being mounted at the upper end.

16. The system of claim 15 wherein the belt supporting assembly includes a motor configured to rotate at least one of the support pulleys to effect movement of the belt, the motor being configured to rotate the belt such that the upper extent of the belt moves in an upward direction toward the upper end of the frame and toward the second support pulley.

17. A plant processing system for processing plant material having at least two types of constituent parts attached together, the system comprising:
a plant stripping apparatus configured to detach the constituent parts of the plant material from each other, the plant stripping apparatus having an input and an output, the plant stripping apparatus being elongated in a longitudinal direction and having a lateral direction oriented substantially perpendicular to the longitudinal direction, the plant stripping apparatus comprising:
a frame;
a plurality of stripping fingers comprising at least two groups of the stripping fingers including a first said group of stripping fingers and a second said group of stripping fingers, at least one group of said stripping fingers being movable with respect to the frame along a path of movement, the first group of fingers extending from a first working surface and the second group of fingers extend from a second working surface, the first working surface being oriented in substantial opposition to the second working surface, a gap being formed between the first and second working surfaces, the gap providing a pathway for movement of plant materials between the input and output of the stripping apparatus; and
a plant part separating apparatus receiving plant material from the output of the plant stripping apparatus and being configured to separate first plant parts of the constituent parts of the plant material from second plant parts of the constituent parts of the plant material;
wherein the plant part separating apparatus has an intake positionable adjacent to the output of the plant stripping apparatus, the plant part separating apparatus including:
a main frame; and
a plurality of separating fingers movable with respect to the frame to engage plant materials received by the intake, the separating fingers being positioned with respect to the intake such that plant materials fall onto a portion of the plurality of separating fingers;
a dislodging assembly configured to dislodge plant materials from the separating fingers and including a plurality of dislodging fingers extending into spaces between the separating fingers, the dislodging fingers being stationary with respect to the moving separating fingers.

18. A plant processing system for processing plant material having at least two types of constituent parts attached together, the system comprising:
a plant stripping apparatus configured to detach the constituent parts of the plant material from each other, the plant stripping apparatus having an input and an output, the plant stripping apparatus being elongated in a longitudinal direction and having a lateral direction oriented substantially perpendicular to the longitudinal direction, the plant stripping apparatus comprising:
a frame;
a plurality of stripping fingers comprising at least two groups of the stripping fingers including a first said group of st one group of said stripping fingers being movable with respect to the frame along a path of movement, the first group of fingers extending from a first working surface and the second group of fingers extend from a second working surface, the first working surface being oriented in substantial opposition to the second working surface, a gap being formed between the first and second working surfaces, the gap providing a pathway for movement of plant materials between the input and output of the stripping apparatus; and a plant part separating apparatus receiving plant material from the output of the plant stripping apparatus and being configured to separate first plant parts of the constituent parts of the plant material from second plant parts of the constituent parts of the plant material;

wherein the plant part separating apparatus has an intake positionable adjacent to the output of the plant stripping apparatus, the plant part separating apparatus including:

a main frame; and a plurality of separating fingers movable with respect to the frame to engage plant materials received by the intake, the separating fingers being positioned with respect to the intake such that plant materials fall onto a portion of the plurality of separating fingers;

a catching assembly configured to catch plant materials falling between the output of the plant stripping apparatus and the intake of the plant part separating apparatus, the catching assembly including a plurality of catching fingers extending into spaces between the separating fingers, the catching fingers being stationary with respect to the moving separating fingers.

\* \* \* \* \*